(12) United States Patent
Clerc

(10) Patent No.: US 12,263,591 B1
(45) Date of Patent: Apr. 1, 2025

(54) HUMANOID TRANSFORMER ROBOTS AND METHODS OF CONTROLLING THE SAME

(71) Applicant: Sanctuary Cognitive Systems Corporation, Vancouver (CA)

(72) Inventor: Vincent Denis Clerc, Montreal (CA)

(73) Assignee: Sanctuary Cognitive Systems Corporation, Vancouver (CA)

( * ) Notice: Subject to any disclaimer, the term of this patent is extended or adjusted under 35 U.S.C. 154(b) by 0 days.

(21) Appl. No.: 18/807,050

(22) Filed: Aug. 16, 2024

Related U.S. Application Data

(60) Provisional application No. 63/659,832, filed on Jun. 14, 2024.

(51) Int. Cl.
*B25J 9/16* (2006.01)
*B25J 17/00* (2006.01)

(52) U.S. Cl.
CPC ............. *B25J 9/162* (2013.01); *B25J 9/1687* (2013.01); *B25J 17/00* (2013.01)

(58) Field of Classification Search
CPC ........... B25J 9/162; B25J 9/1687; B25J 17/00
USPC ........................................................ 700/245
See application file for complete search history.

(56) References Cited

U.S. PATENT DOCUMENTS

| | | | | |
|---|---|---|---|---|
| 4,682,969 A | * | 7/1987 | Choy ................... | A63H 33/003 446/376 |
| 7,902,784 B1 | * | 3/2011 | Theobald ............. | B62D 55/075 318/568.1 |
| 2004/0162636 A1 | * | 8/2004 | Hattori ................ | B62D 57/032 318/568.11 |
| 2012/0283746 A1 | | 11/2012 | Hu | |
| 2018/0345479 A1 | * | 12/2018 | Martino ................ | B25J 9/1697 |
| 2019/0202052 A1 | * | 7/2019 | Chen ..................... | B25J 9/1697 |
| 2022/0395974 A1 | * | 12/2022 | Balasubramanian ....... | B62D 57/028 |
| 2024/0100702 A1 | | 3/2024 | Saunders | |

FOREIGN PATENT DOCUMENTS

| | | |
|---|---|---|
| CN | 114701581 A | 7/2022 |
| KR | 20200010936 A | 1/2020 |

OTHER PUBLICATIONS

Notice of References Cited, U.S. Appl. No. 18/807,017, filed Oct. 10, 2024.

* cited by examiner

*Primary Examiner* — Kira Nguyen
(74) *Attorney, Agent, or Firm* — Thomas Mahon; Adenike Adebiyi

(57) ABSTRACT

A robot includes a mobile base comprising a base body with a set of active wheels, an upper body comprising a torso with arms, and a pedestal linkage having a first end coupled to the base body by a first pivotable joint and a second end coupled to the torso by a second pivotable joint, wherein the pedestal linkage is pivotable relative to the base body to transform the robot between an elevated, elongated, or standing configuration and a lowered, contracted, or sitting configuration. In the second configuration, an omniwheel positioned at the base of the torso contacts the ground to improve stability of the system, and the pedestal linkage is received in a slot in the base body to produce a congruous work surface over which the torso may be rotated to face and upon which objects may be placed and manipulated during transport.

17 Claims, 22 Drawing Sheets

HUMANOID TRANSFORMER ROBOTS AND METHODS OF CONTROLLING THE SAME

This application claims priority to U.S. Provisional Patent Application No. 63/659,832, filed on Jun. 14, 2024, titled "Humanoid Transformer Robot", the entirety of which is incorporated by reference herein.

FIELD

The present robots and methods generally relate to mobile robot systems, and in particular to transformable robot systems.

BACKGROUND

Robots are machines that can sense their environments and perform tasks autonomously or semi-autonomously or via teleoperation. A humanoid robot is a robot or machine having an appearance and/or character resembling that of a human. Humanoid robots can be designed to function as team members with humans in diverse applications, such as construction, manufacturing, monitoring, exploration, learning, and entertainment. Humanoid robots can be particularly advantageous in substituting for humans in environments that may be dangerous to humans or uninhabitable by humans.

SUMMARY

In a representative example, a humanoid robot includes an upper robot body comprising a torso, a mobile base comprising a robot base and a set of active wheels coupled to the robot base, and a pedestal linkage having a first end portion pivotably coupled to the robot base and a second end portion pivotably coupled to the torso, wherein the pedestal linkage is pivotable relative to the robot base to transform the torso between a standing configuration and a sitting configuration.

According to a broad aspect, the present disclosure describes a robot comprising: an upper body comprising a torso and at least a first arm coupled to the torso, the first arm including a first end effector; a mobile base comprising a base body and a set of wheels coupled to the base body; and a pedestal linkage that couples the torso to the base body, wherein coupling between the torso and the base body through the pedestal linkage is controllable to transform the robot into and between each of a first configuration in which the upper body is elevated above the mobile base and a second configuration in which the upper body is positioned at the mobile base.

The pedestal linkage may comprise a first end portion pivotally coupled to the base body at first pivot joint and a second end portion pivotally coupled to the torso at a second pivot joint; and the first pivot joint and the second pivot joint may both be controllable to transform the robot between the first configuration and the second configuration. The robot may further comprise: a first actuator with a non-backdrivable mechanism to control the first pivot joint.

In the second configuration the upper body may be positioned at or adjacent a second end of the base body. The first pivot joint may be positioned at a first end of the base body opposite the second end. The robot may further comprise at least one passive wheel coupled to the pedestal linkage at a base of the torso, and the at least one passive wheel may engage a ground in the second configuration. A dorsal surface of the pedestal linkage and a top surface of the base body may form a congruent work surface in the second configuration. The torso may be rotatable about a rotational axis that is orthogonal to a pivot axis of the second pivot joint. The base body may include a work surface and the rotational axis may extend normal to the work surface. The torso may be rotatable about the rotational axis through at least 180 degrees in at least one direction such that the torso can face towards and away from the work surface in at least the second configuration.

The first end portion may extend in a first direction and the second end portion may extend in second direction non-parallel to the first direction to align a center of gravity of the upper body over the mobile base when the robot is in the first configuration.

The first pivot joint may be positioned at a first end of the mobile base; the mobile base may have a second end opposite the first end; in the first configuration, the upper body may be positioned above the mobile base in between the first end and the second end of the mobile base; and in the second configuration, the upper body may be positioned adjacent the second end of the mobile base.

The base body may include a first foot portion and a second foot portion laterally separate from the first foot portion by a slot; the base body may further comprise a connection portion which connects the first foot portion and the second foot portion; the first pivot joint may be positioned at the connection portion; the pedestal linkage may be pivotable at the first pivot joint to be at least partially received in the slot; a first upper surface of the first foot portion may include a first planar region; a second upper surface of the second foot portion may include a second planar region coplanar with the first planar region; and the pedestal linkage may include a third planar region which is coplanar with the first and second planar regions when the pedestal linkage is in the second configuration with the pedestal linkage received in the slot.

The robot may further comprise at least one passive wheel coupled to the pedestal linkage at a base of the torso, and the at least one passive wheel may engage a ground in the second configuration. The set of wheels may comprise a set of active wheels and the at least one passive wheel may comprise at least one omni-wheel.

The set of wheels may comprise a set of active wheels.

The robot may further comprise an energy storage unit integrated in a volume of the pedestal linkage.

The mobile base may be positioned in an xy-plane; the upper body may be positioned in an xz-plane; the pedestal linkage may be positioned in the xz-plane and may be coupled to the mobile base at a first pivot joint at which the pedestal linkage is pivotable in the xz-plane about a first y-axis and to the torso at a second pivot joint at which the pedestal linkage is pivotable in the xz-plane about a second y-axis; in the first configuration, the pedestal linkage may be pivoted to position at least a portion of the pedestal linkage out of and non-parallel to the xy-plane; and in the second configuration, the pedestal linkage may be pivoted to position the at least a portion of the pedestal linkage co-planar or parallel to the xy-plane. The torso may be pivotable at the second pivot joint to counteract tilting of the torso due to pivoting of the pedestal linkage at the first pivot joint. The pedestal linkage may have a first length which spatially separates the first y-axis and the second y-axis in the xz-plane; the first pivot joint may be positioned at a first end of the mobile base; and the mobile base may have a second end opposite the first end in an x-direction, and a distance between the first end and the second end of the mobile base may be a second length less than or equal to the first length of the pedestal linkage.

Coupling between the base body and the torso may be continuously controllable to transform the robot continuously into and between the first configuration and the second configuration.

According to another broad aspect, the present disclosure describes a method of controlling a robot, the robot including an upper body having a torso, a mobile base having a base body and a set of wheels coupled to the base body, and a pedestal linkage that couples the torso to the base body, the method comprising: transforming the robot from a second configuration to a first configuration, wherein transforming the robot from the second configuration to the first configuration includes: controlling a coupling between the torso and the base body through the pedestal linkage to elevate the upper body above the mobile base; and transforming the robot from the first configuration to the second configuration, wherein transforming the robot from the first configuration to the second configuration includes: controlling the coupling between the torso and the base body through the pedestal linkage to lower the upper body to be positioned at the mobile base.

The pedestal linkage may comprise a first end portion pivotally coupled to the base body at a first pivot joint and a second end portion pivotally coupled to the torso at a second pivot joint; transforming the robot from the second configuration to the first configuration may comprise: actuating the first pivot joint to pivot the pedestal linkage second end portion upwards; and actuating the second pivot joint to counteract tilting of the torso due to pivoting of the pedestal linkage at the first pivot joint; and transforming the robot from the first configuration to the second configuration may comprise: actuating the first pivot joint to pivot the pedestal linkage second end portion downwards; and actuating the second pivot joint to counteract tilting of the torso due to pivoting of the pedestal linkage at the first pivot joint.

The base body may include a first foot portion and a second foot portion laterally separated from the first foot portion by a slot; and actuating the first pivot joint to pivot the pedestal linkage second end portion downwards may comprise: actuating the first pivot joint to pivot the pedestal linkage second end portion downwards until the pedestal linkage is received in the slot with an upper surface of the first foot portion, an upper surface of the second foot portion, and a planar surface of the pedestal linkage forming a congruent work surface in the second configuration.

The second pivot joint may pivot about a pivot axis, and the method may further comprise: actuating a rotatable joint between the second pivot joint and the torso to rotate the torso about a rotational axis that is orthogonal to the pivot axis. The base body may include a work surface and the rotational axis may extend normal to the work surface; and rotating the torso about the rotational axis may comprise rotating the torso about the rotational axis through at least 180 degrees in at least one direction to transform the robot between the torso facing away from the work surface and the torso facing towards the work surface in at least the second configuration.

The method may further comprise: after transforming the robot to the first configuration, actuating at least one arm coupled to the torso to pick up an object in an environment of the robot; and after transforming the robot to the second configuration, placing the object on a work surface of the robot formed by the base body and the pedestal linkage in the second configuration. The second pivot joint may pivot about a pivot axis; and the method may further comprise: after picking up the object, prior to placing the object on the work surface of the robot, actuating a rotatable joint between the second pivot joint and the torso to rotate the torso about a rotational axis to face the work surface, the rotational axis orthogonal to the pivot axis and normal to the work surface. The set of wheels may be a set of active wheels, and the method may further comprise: after placing the object on the work surface of the robot, driving the robot by the set of active wheels to change a location of the robot. The method may further comprise, after changing the location of the robot: actuating the at least one arm coupled to the torso to pick up the object from the work surface of the robot; transforming the robot from the second configuration to the first configuration; and actuating the at least one arm coupled to the torso to place the object in the environment of the robot. The method may further comprise: while driving the robot, maintaining the at least one arm in a stabilizing configuration proximate the object. The method may further comprise: while driving the robot, interacting with the object on the work surface.

The first pivot joint may be positioned at a first end of the mobile base; the mobile base may have a second end opposite the first end; elevating the upper body above the mobile base may comprise: actuating the first pivot joint to pivot the pedestal linkage second end portion upwards to position the upper body above the mobile base in between the first end and the second end of the mobile base; and lowering the upper body to the mobile base may comprise: actuating the first pivot joint to pivot the pedestal linkage second end portion downwards to position the upper body adjacent the second end of the mobile base.

At least one passive wheel may be coupled to the pedestal linkage at a base of the torso; and lowering the upper body to the mobile base may comprise: actuating the first pivot joint to pivot the pedestal linkage second end portion downwards to position the upper body adjacent an end of the mobile base with the at least one passive wheel in contact with a ground surface.

Lowering the upper body to the mobile base may comprise: actuating the first pivot joint to pivot the pedestal linkage second end portion downwards where a dorsal surface of the pedestal linkage and an upper surface of the base body form a congruent work surface in the second configuration.

The method may further comprise driving the robot by a set of active wheels included in the mobile base.

The method may further comprise actuating at least one arm coupled to the torso to engage with an object in an environment of the robot.

The mobile base may be positioned in an xy-plane; the upper body may be positioned in an xz-plane; the pedestal linkage may be positioned in the xz-plane and may be coupled to the mobile base at a first pivot joint at which the pedestal linkage is pivotable in the xz-plane about a first y-axis and to the torso at a second pivot joint at which the pedestal linkage is pivotable in the xz-plane about a second y-axis; transforming the robot from the second configuration to the first configuration may comprise controlling the first pivot joint to pivot the pedestal linkage to position at least a portion of the pedestal linkage out of and non-parallel to the xy-plane; and transforming the robot from the first configuration to the second configuration may comprise controlling the first pivot joint to pivot the pedestal linkage to position the at least a portion of the pedestal linkage co-planar or parallel to the xy-plane. The method may further comprise controlling the second pivot joint to counteract tilting of the torso due to pivoting of the pedestal linkage at the first pivot joint.

BRIEF DESCRIPTION OF THE DRAWINGS

The various elements and acts depicted in the drawings are provided for illustrative purposes to support the detailed description. Unless the specific context requires otherwise, the sizes, shapes, and relative positions of the illustrated elements and acts are not necessarily shown to scale and are not necessarily intended to convey any information or limitation. In general, identical reference numbers are used to identify similar elements or acts.

DETAILED DESCRIPTION

General Considerations

Figure 1:
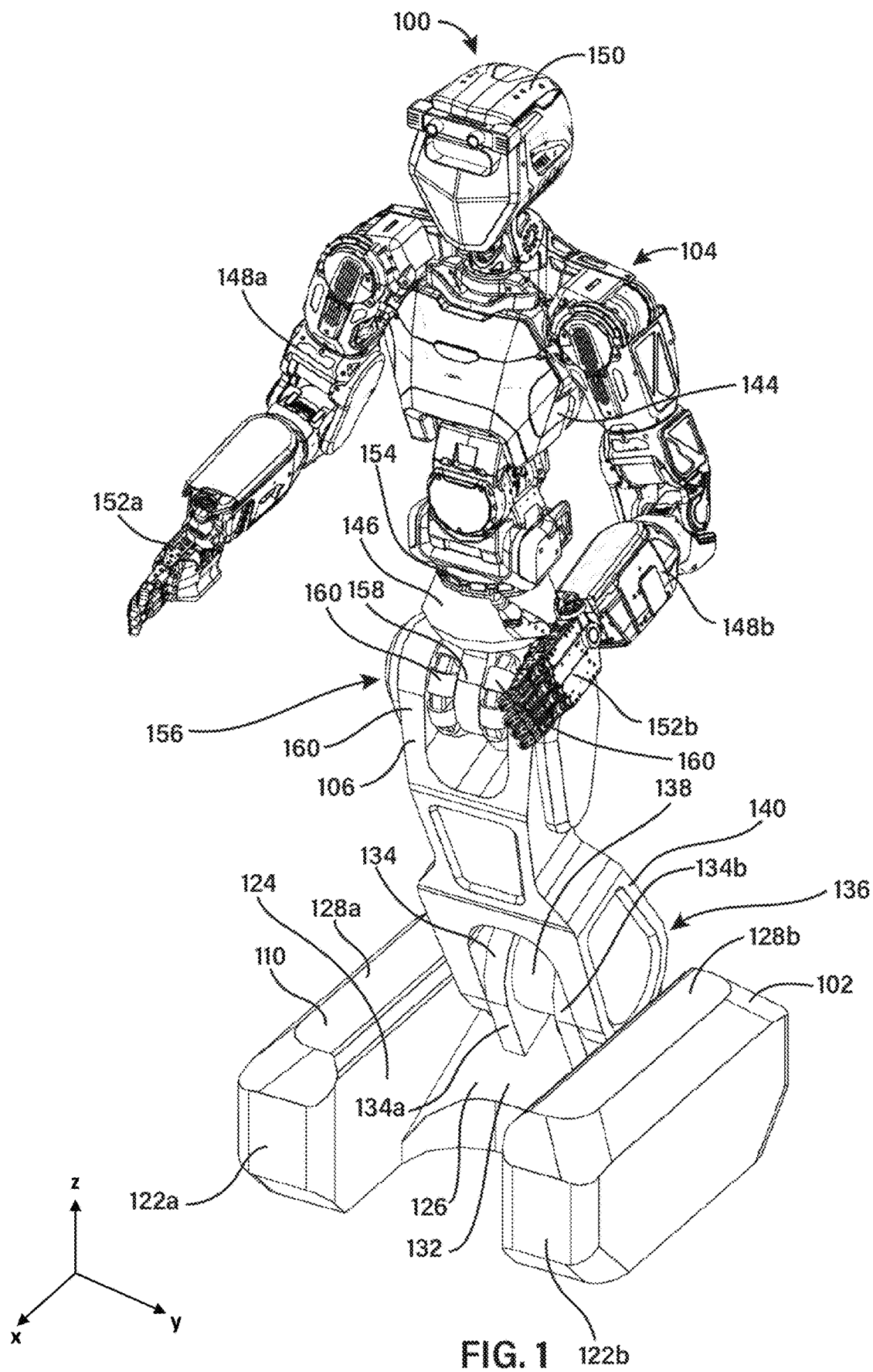
FIG. 1 is a perspective front view of a humanoid transformer robot in a first configuration.

For the purpose of this description, certain specific details are set forth herein in order to provide a thorough understanding of disclosed technology. In some cases, as will be recognized by one skilled in the art, the disclosed technology may be practiced without one or more of these specific details, or may be practiced with other methods, structures, and materials not specifically disclosed herein. In some instances, well-known structures and/or processes associated with robots have been omitted to avoid obscuring novel and non-obvious aspects of the disclosed technology.

All the examples of the disclosed technology described herein and shown in the drawings may be combined without any restrictions to form any number of combinations, unless the context clearly dictates otherwise, such as if the proposed combination involves elements that are incompatible or mutually exclusive. The sequential order of the acts in any process described herein may be rearranged, unless the context clearly dictates otherwise, such as if one act or operation requests the result of another act or operation as input.

In the interest of conciseness, and for the sake of continuity in the description, same or similar reference characters may be used for same or similar elements in different figures, and description of an element in one figure will be deemed to carry over when the element appears in other figures with the same or similar reference character, unless stated otherwise. In some cases, the term "corresponding to" may be used to describe correspondence between elements of different figures. In an example usage, when an element in a first figure is described as corresponding to another element in a second figure, the element in the first figure is deemed to have the characteristics of the other element in the second figure, and vice versa, unless stated otherwise.

The word "comprise" and derivatives thereof, such as "comprises" and "comprising", are to be construed in an open, inclusive sense, that is, as "including, but not limited to". The singular forms "a", "an", "at least one", and "the" include plural referents, unless the context dictates otherwise. The term "and/or", when used between the last two elements of a list of elements, means any one or more of the listed elements. The term "or" is generally employed in its broadest sense, that is, as meaning "and/or", unless the context clearly dictates otherwise. When used to describe a range of dimensions, the phrase "between X and Y" represents a range that includes X and Y. As used herein, an "apparatus" may refer to any individual device, collection of devices, part of a device, or collections of parts of devices.

The term "coupled" without a qualifier generally means physically coupled or lined and does not exclude the presence of intermediate elements between the coupled elements absent specific contrary language. The term "plurality" or "plural" when used together with an element means two or more of the element. Directions and other relative references (e.g., inner and outer, upper and lower, above and below, and left and right) may be used to facilitate discussion of the drawings and principles but are not intended to be limiting.

The headings and Abstract are provided for convenience only and are not intended, and should not be construed, to interpret the scope or meaning of the disclosed technology.

Example I-Overview

Described herein are humanoid transformer robots that are mobile and transformable between a first configuration and a second configuration. The first and second configurations can be referred to by any number of different terms, as appropriate for a given application. In some implementations, the first configuration can be a "standing" configuration where the robot approximates a form of a standing human, and the second configuration can be a "sitting" configuration where the robot approximates a form of a sitting human. In some implementations, the first configuration can be an "elevated" configuration where part of the robot is elevated, and the second configuration can be a "lowered" or "collapsed" configuration where part of the robot is lowered (relative to the elevated configuration). In some implementations, the first configuration can be an "elongated" configuration where a shape of the robot is elongated (relative to a "contracted" configuration), and the second configuration can be a "contracted" configuration where a shape of the robot is contracted (relative to the elongated configuration). These exemplary terms are discussed in more detail throughout this disclosure, and one skilled in the art will appreciate that other terms could also be used to describe the first and second configurations as appropriate in a given application, implementation, scenario, or context. The humanoid transformer robot can move with greater speed and more agility compared to a bipedal robot, especially when carrying a payload.

Generally, humanoid transformer robots include some aspects which emulate or approximate human anatomy, such as an upper body, a torso, arms, hands, and a head (as non-limiting examples). However, the humanoid transformer robots discussed herein do not necessarily approximate all aspects of human anatomy. Namely, the humanoid transformer robots discussed herein generally do not include bipedal legs as humans do. Further, other aspects of human anatomy may not be approximated by the robots herein (e.g. a head, face, eyes, muscles, or any other number of human features may be simplified, omitted, or replaced by other structures as appropriate for a given application).

The humanoid transformer robot includes an upper robot body, a mobile base, and a pedestal linkage coupling the upper robot body to the mobile base. Throughout this disclosure, the upper robot body can also be referred to as an "upper body". The pedestal linkage and mobile base are configured to support the weight of the upper robot body. The mobile base can include wheels that can be driven to provide the humanoid transformer robot with mobility. In some examples, the mobile base can be controlled by a robot controller coupled to the upper robot body. In some examples, the mobile base uses mecanum wheels to achieve versatile motion (e.g., forward, backward, sideways, and circular motions).

In some implementations, the upper robot body can be transformably positioned between approximately a standing height and approximately a sitting height by adjusting the pedestal linkage relative to the mobile base. In some implementations, adjusting the pedestal linkage includes pivoting the pedestal linkage about at least one pivotable joint. In some examples, the at least one pivotable joint between the pedestal linkage and the mobile base includes a non-back-drivable mechanism, which can prevent accidental or unintentional pivoting of the pedestal linkage. In the second configuration, the pedestal linkage (or at least a portion thereof) may be generally flush with the mobile base so that contiguous surfaces of the pedestal linkage and mobile base can form a work surface for the upper robot body. In some examples, the upper robot body is rotatable relative to the pedestal linkage (e.g., rotatable through 180 degrees in opposite directions or through 360 degrees in the same direction), which can allow the upper robot body to turn as needed to load objects onto or unload objects from the work surface while in the second configuration. The ability to rotate the upper robot body can also allow use of vision sensors on the upper robot body for control of the movement of the mobile base.

In some examples, the pedestal linkage includes at least one passive wheel that lands on the ground when the humanoid transformer robot is in the second configuration. The passive wheel can provide additional stability for the upper robot body when the upper robot body is in the second configuration. In some examples, one or more energy storage device(s) (e.g., battery or supercapacitor) can be integrated into a volume of the pedestal linkage. The energy storage device can be used to provide electrical power to selected electrical components in the humanoid transformer robot and/or used as a backup power supply. The weight of wheels (e.g. mecanum wheels) and motors in the mobile base and/or the weight of the energy storage in the pedestal linkage can contribute to a low center of gravity and increase the stability of the system, thereby allowing support of a heavier, stronger upper robot body for increased payload capacity of the robot without comprising dexterity of the robot.

Example II-Humanoid Transformer Robot

Figure 12:
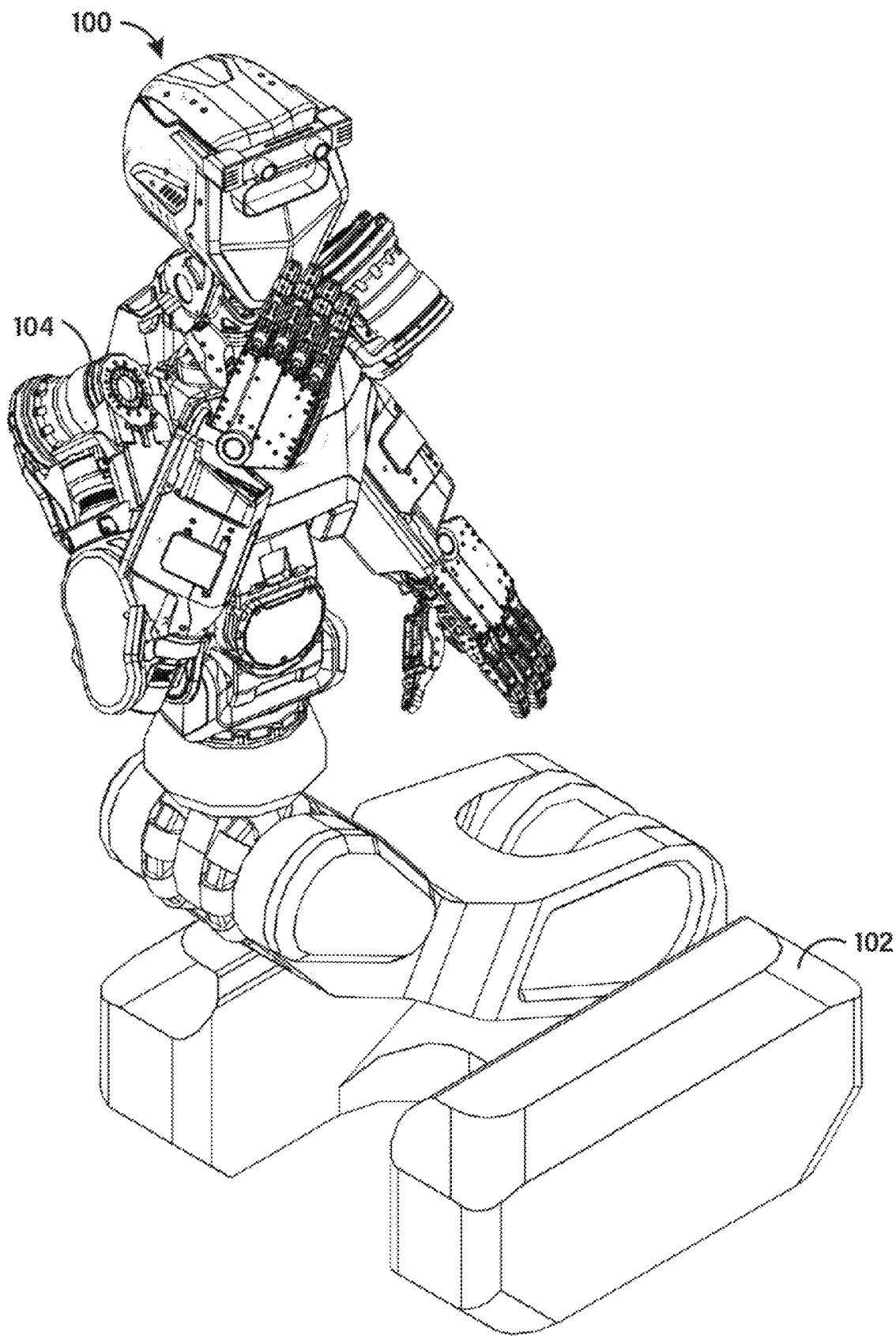
FIG. 12 illustrates a position in transformation of the humanoid transformer robot between the first configuration shown in FIG. 1 and the second configuration shown in FIG. 6.

FIGS. 1-12 illustrate various views of a humanoid transformer robot 100. The humanoid transformer robot 100 includes a mobile base 102 including a base body 110, an upper body 104 including a torso 144, and a pedestal linkage 106 coupling the base body 110 of the mobile base 102 to the torso 144 of the upper body 104. The pedestal linkage 106 and the mobile base 102 support the weight of the upper body 104. The pedestal linkage 106 is pivotable relative to the mobile base 102 and can position the upper body 104 at various heights relative to the ground. Generally, the coupling between the torso 144 and the base body 110 through the pedestal linkage 106 is controllable to transform the robot 100 into and between a first configuration (examples shown in FIGS. 1-5) where the upper body 104 is elevated relative to the mobile base 102 and a second configuration (examples shown in FIGS. 6-11) where the upper body 104 is positioned at the mobile base (e.g. adjacent or proximate the mobile base 102, as discussed later with reference to FIGS. 6 and 7). In some implementations, in the first configuration the upper body 104 is positioned such that the robot 100 is at a full standing height (e.g. approximately human height when standing) and the first configuration can be referred to as a "standing configuration" of the humanoid transformer robot 100, in the examples shown in FIGS. 1-5. In some implementations, in the second configuration the upper body 104 is positioned such that the robot 100 is at a sitting height (e.g. approximately human height when sitting) and the second configuration can be referred to as a "sitting configuration" of the humanoid transformer robot 100 in the examples shown in FIGS. 6-11. The upper body 104 can be positioned at positions between the first configuration and the second configuration (e.g. between the full standing height and the sitting height), such as shown in FIG. 12. In some implementations, the upper body 104 is continuously positionable between the first configuration and the second configuration. That is, in some implementations the coupling between the base body 110 and the upper body 104 (including torso 144 discussed later) is continuously controllable to transform the robot 100 continuously into and between the first configuration and the second configuration. In some implementations the upper body 104 is discretely positionable to at least one discrete position between the first configuration and the second configuration. The mobile base 102 has wheeled locomotion that enables movement of the humanoid transformer robot 100 in an environment. The mobile base 102 can have a relatively small footprint (e.g., within approximately 2 feet by 2 feet), which can allow the humanoid transformer robot 100 to move through tight spaces within the environment.

In an exemplary implementation, the mobile base 102 includes a base body 110 and a drivetrain 112 (shown in FIGS. 15 and 16) coupled to the base body 110. The drivetrain 112 includes a set of active wheels (or driving wheels) 114. In some examples, the drivetrain 112 can be a holonomic drivetrain where the active wheels 114 are powered mecanum wheels. In one example, the set of active wheels 114 can include four mecanum wheels 114. Two active wheels 114 can be provided on each of the opposite sides of the base body 110. In other examples, the set of active wheels 114 may have fewer than four mecanum wheels (e.g., three wheels) or greater than four wheels (e.g., five wheels). In the exemplary illustrated drivetrain geometry, the axle lines L (shown in FIG. 16) of the mecanum wheels 114 are parallel to each other. However, other geometries are possible (e.g., the axle lines may be at 90 degrees to each other or at 45 degrees to each other; other angles may be involved when the number of mecanum wheels is other than four). In an exemplary scenario, a robot equipped with 4 mecanum wheels each powered by a 200 W electric motor can tow, push, or otherwise move at least 70 kg.

In some examples, each of the mecanum wheels 114 may have a corresponding base motor (not visible in the drawing) to drive the wheel (the term "base" is used to identify the motors associated with the mobile base). Driving the wheel can include rotating the wheel about its axle line while the wheel is in contact with the ground. In some examples, the wheel may be mounted directly on an output shaft of the base motor. In other examples, the base motor may engage the wheel through a set of gears. In other examples, a single base motor may drive two or more mecanum wheels (e.g., a single motor may drive all the mecanum wheels). In these other examples, the drivetrain 112 can include a transmission to couple the output of the single motor to multiple mecanum wheels.

Figure 16:
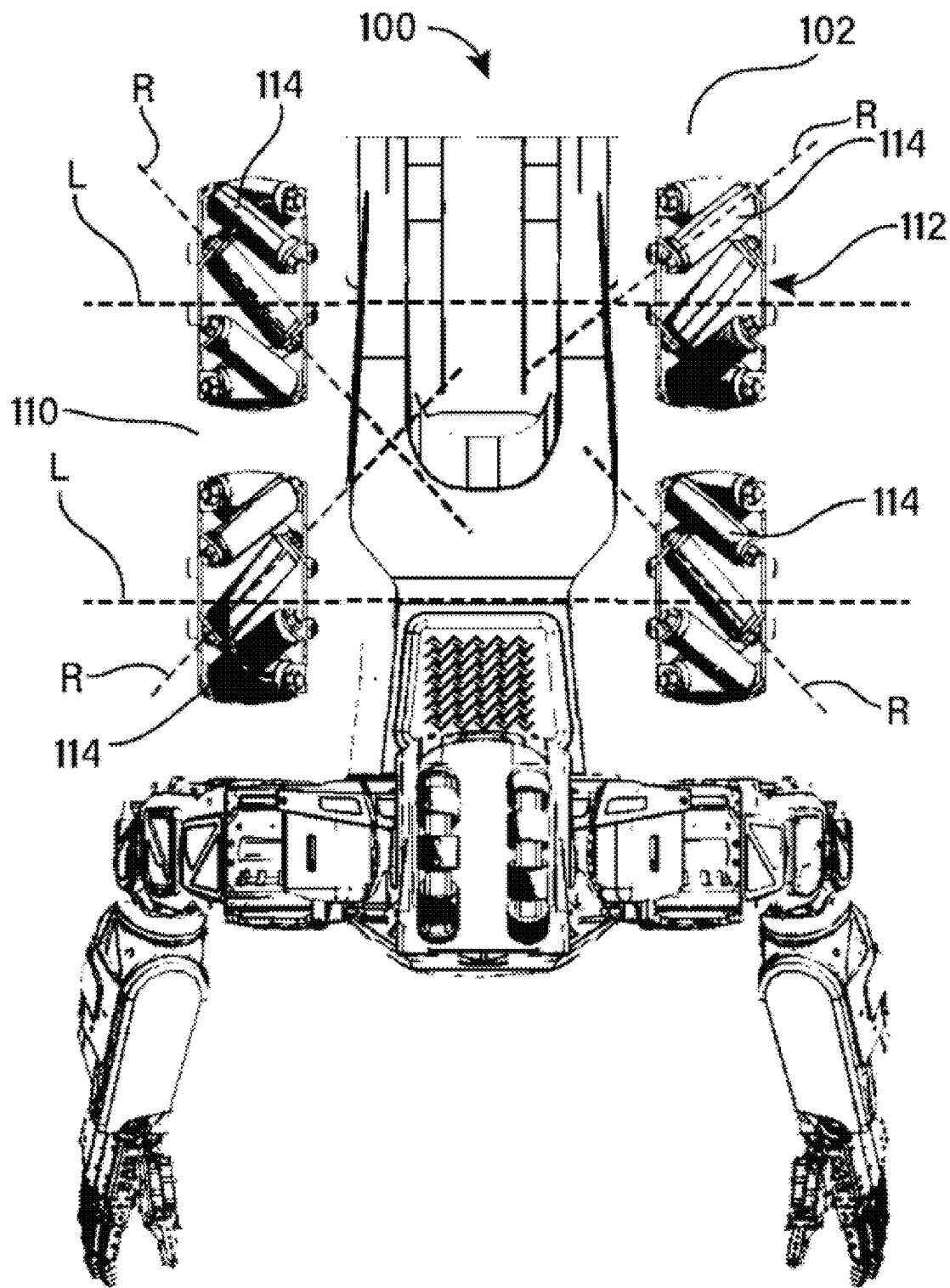
FIG. 16 is a bottom view of the humanoid transformer robot shown in FIG. 15.
Figure 17A:
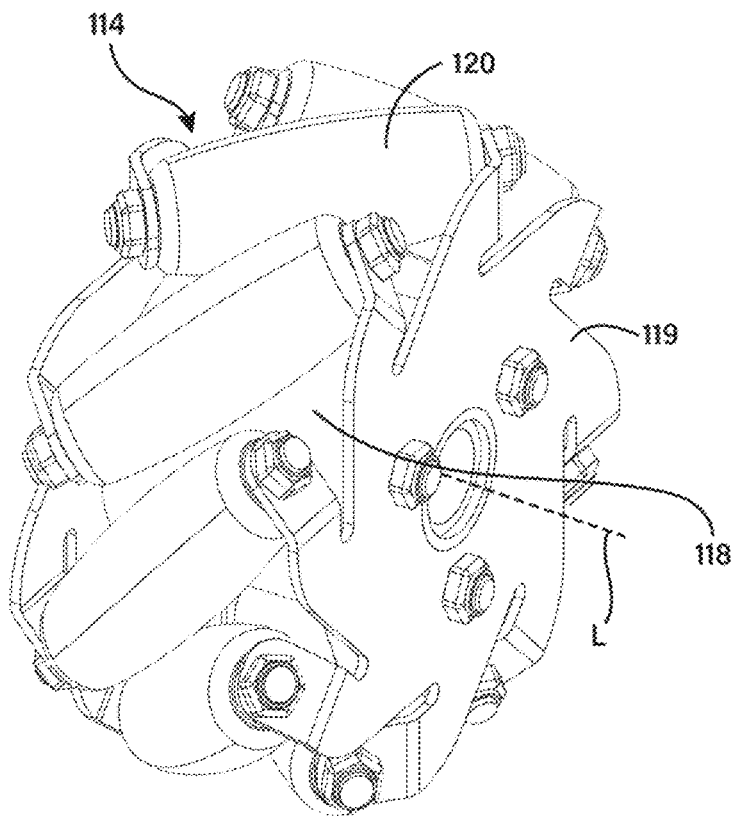
FIG. 17A is a perspective view of a mecanum wheel.
Figure 18:
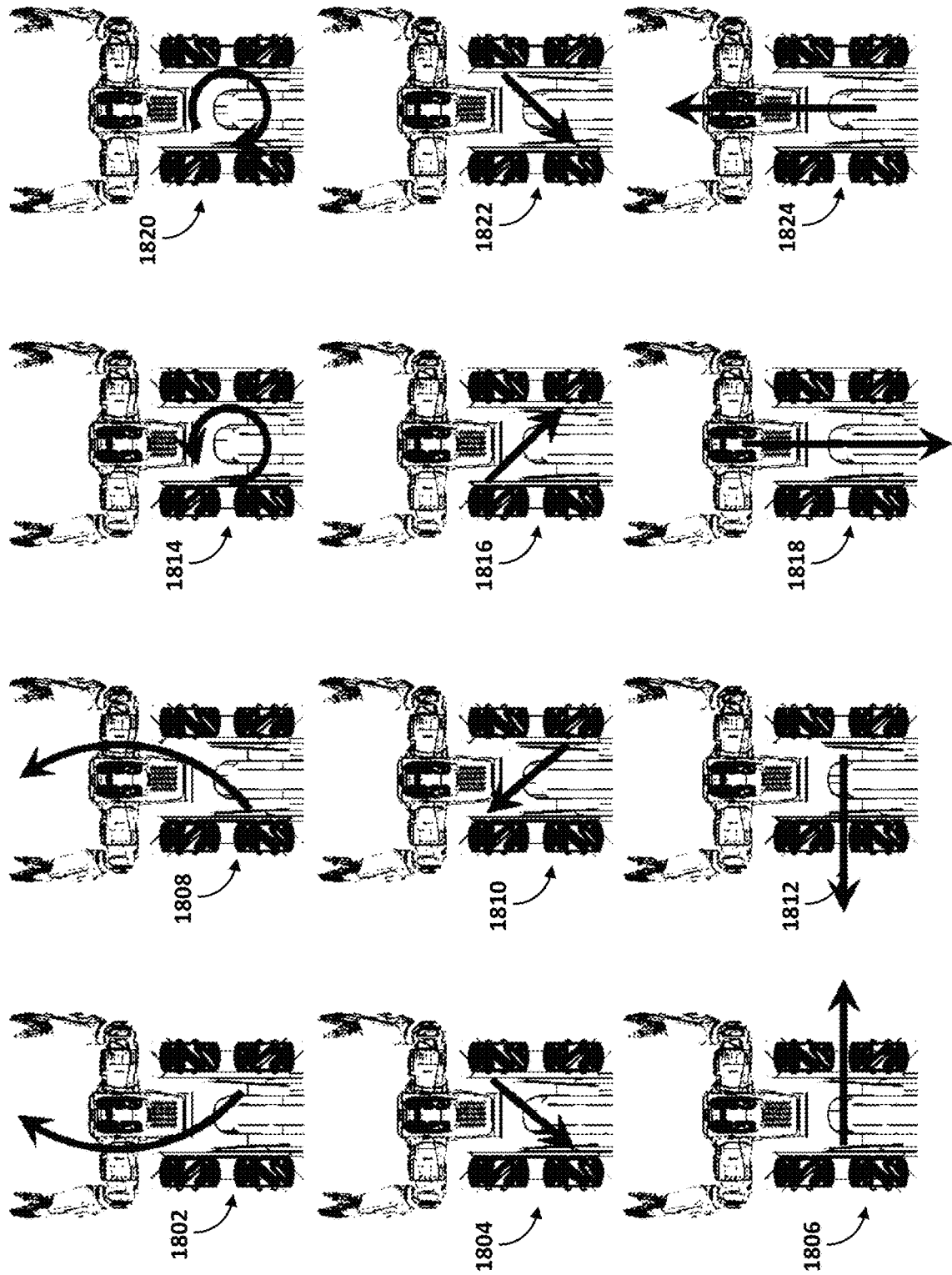
FIG. 18 is a plurality of bottom views of a robot which illustrate movements of a mobile base equipped with mecanum wheels.

Mecanum wheels are omnidirectional wheels that can allow the mobile base 102 to move in various directions (e.g., the mobile base 102 can move forward, backward, sideways, or circularly). Each mecanum wheel can have four degrees of freedom. As shown in FIG. 17A, a mecanum wheel 114 can include a hub 118 that defines an axle line L (e.g., the longitudinal axis of the hub defines the axle line) and a series of rollers 120 (e.g., rubberized rollers) on the circumference of the hub 118. The rollers 120 can be attached to the hub 118 by a fork structure 119. The rollers 120 are supported such that they can rotate relative to the hub 118. The rollers 120 are typically in the form of a cylinder with one or both ends tapered (the rotation axes of two rollers with one end tapered may be aligned to form one roller with both ends tapered). The axis of rotation of each roller is oriented obliquely to the axle line (e.g., at 45 degrees to the axle line). As shown in FIG. 16, the wheels 114 may be arranged such that the axes of rotation R of the rollers on the wheels point towards the center of the robot base. When a mecanum wheel 114 is spinning, the mecanum wheel 114 generates a propelling force that is perpendicular to the rotation axes of the respective rollers, which can be vectored into a longitudinal and a transverse component in relation to the mobile base. FIG. 18 shows various examples of motions of the mobile base 102 that can be enabled by the mecanum wheels 114.

A plurality of exemplary motions 1802, 1804, 1806, 1808, 1810, 1812, 1814 1816, 1818, 1820, 1822, and 1824 are shown in FIG. 18 and are discussed below, with reference to orientation of text in FIG. 18. For example, "top-left" with reference to an element in FIG. 18 refers to an element which appears in a top-left position within the Figure with the text in the upright orientation. The term "forward" with regards to the movement of the robot refers to movement in a front-facing direction of the robot. The term "backward" with regards to the movement of the robot refers to movement in a rear-facing direction of the robot. The term "forward" with regard to rotation of a wheel refers to a rotational direction which when applied to an ordinary (non-mecanum) wheel would propel the robot forward. The term "backward" with regard to rotation of a wheel refers to a rotational direction which when applied to an ordinary (non-mecanum) wheel would propel the robot backward.

Motion 1802 is a swoop motion where the robot is driven forwards and turned to the right, which is achieved by rotating the left wheels of the robot in a forward direction while holding the right wheels stationary. Motion 1804 is a backwards-left motion where the robot is driven backwards and to the left without turning, which is achieved by rotating the top-left wheel and the bottom-right wheel backwards while holding the top-right wheel and the bottom-left wheel stationary. Motion 1806 is rightwards motion where the robot is driven to the right without turning, which is achieved by rotating the top-left and bottom-right wheels forwards while rotating the top-right and bottom-left wheels backwards. Motion 1808 is a swoop motion where the robot is driven forwards and turned to the left, which is achieved by rotating the right wheels forward while holding the left wheels stationary. Motion 1810 is a forward-left motion where the robot is driven forwards and to the left without turning, which is achieved by rotating the top-right and bottom-right wheel forwards while holding the top-left and bottom right-wheel stationary. Motion 1812 is a leftwards motion where the robot is driven to the left without turning, which is achieved by rotating the top-right and bottom-left wheels forwards while rotating the top-left and bottom-right wheels backwards. Motion 1814 is a counter-clockwise motion where the robot is turned in a counter-clockwise direction without changing position, which is achieved by rotating the left wheels backwards while rotating the right wheels forwards. Motion 1816 is a backward-right motion where the robot is driven backwards and to the right without turning, which is achieved by rotating the top-right and bottom-left wheels backwards while holding the top-left and bottom-right wheels stationary. Motion 1818 is a backwards motion where the robot is driven backwards, which is achieved by driving all wheels backwards. Motion 1820 is a clockwise motion where the robot is turned clockwise without changing position, which is achieved by rotating the right wheels forwards while rotating the left wheels backwards. Motion 1822 is a backward-left motion where the robot is driven backwards and to the left without turning, which is achieved by rotating the top-left and bottom-right wheels backwards while holding the top-right and bottom-left wheels stationary. Motion 1824 is a forward motion where the robot is driven forwards by rotation all of the wheels forwards.

In some examples, the base body 110 can have two feet portions (or foot portions, respectively) 122a, 122b (identified in FIGS. 1-2) that are parallel to each other and spaced apart (laterally separated) by a slot 124. The base body 110 can have a connection portion 126 that extends between and adjoins the two feet portions 122a, 122b on opposite sides. The connection portion 126 can maintain the slot 124 between the two feet portions 122a, 122b as well as couple the feet portions 122a, 122b together. In the illustrated examples, the connection portion 126 is positioned at one end of the slot 124, and the other end of the slot 124 opposite to the connection portion is open (e.g., the feet portions 122a, 122b and connection portion 126 form a U shape). The open end of the slot 124 is sized to receive at least a portion of the pedestal linkage between the feet portions 122a and 122b. The open end of the slot 124 can allow the pedestal linkage 106 to protrude from the mobile base 102 when received in the slot 124 (see FIGS. 6 and 9, for example, where pedestal linkage 106 extends beyond base body 110). In this implementation, the upper body 104 is positioned adjacent a first end of the base body 110 (e.g. a base of upper body 104, shown as torso base 146, is positioned at or outside a peripheral edge of the base body 110; in some cases torso base 146 could abut or nearly abut the first end of the base body 110). The active wheels 114 are coupled to the feet portions 122a, 122b.

The feet portions 122a, 122b have top surfaces 128a and 128b (first and second planar regions) that may be in the same plane (coplanar) and can provide portions of a work surface for the robot 100 when the upper body 104 is positioned at the base body 110 when the robot 100 is in the second configuration. Additionally, the pedestal linkage 106 can include a third planar region (dorsal surface 142 in FIG. 13) which is coplanar with the first and second planar regions when the pedestal linkage is in the second configuration with the pedestal linkage 106 received in the slot 124. In some examples, non-skid material (or gripping pads) (130a, 130b in FIG. 13) can be attached to the top surfaces 128a, 128b (or portions thereof) to provide a slip-free work surface. A non-skid material (or gripping pad) 143 can be attached to surface 142 or portion thereof to provide a slip-free work surface. A top surface 132 of the connection portion 126 can be recessed relative to the top surfaces 128a, 128b of the two feet portions 122a, 122b. The connection portion 126 can include a support fixture 134 projecting upwardly from the top surface 132. The support fixture 134 can, for example, include a pair of support flanges 134a, 134b arranged in parallel and having central openings that are axially aligned. In some examples, the support fixture 134 may protrude above the top surfaces 128a, 128b of the feet portions 122a, 122b. The support fixture 134 can be used to couple the pedestal linkage 106 to the robot base 110. For example, the lower pivot joint (first pivot joint) 136 discussed later can be positioned at the connection portion 126, such that the pedestal linkage 106 is pivotable at the lower pivot joint 136 to be at least partially received in the slot 124.

In some examples, the base body 110 may be a single molded plastic robot base. In other examples, the base body 110 may have a chassis to which the active wheels 114 are coupled (or to which the base motors for the active wheels 114 are coupled) and a molded plastic cover attached to the chassis and enclosing the base motors. The chassis may have feet portions and a connection portion, and the molded plastic cover may have corresponding portions to cover the chassis. The chassis can be made of metal or alloy (e.g., aluminum). The plastic used in the molded plastic robot base or molded plastic cover for the robot base can be a hard plastic material.

Figure 2:
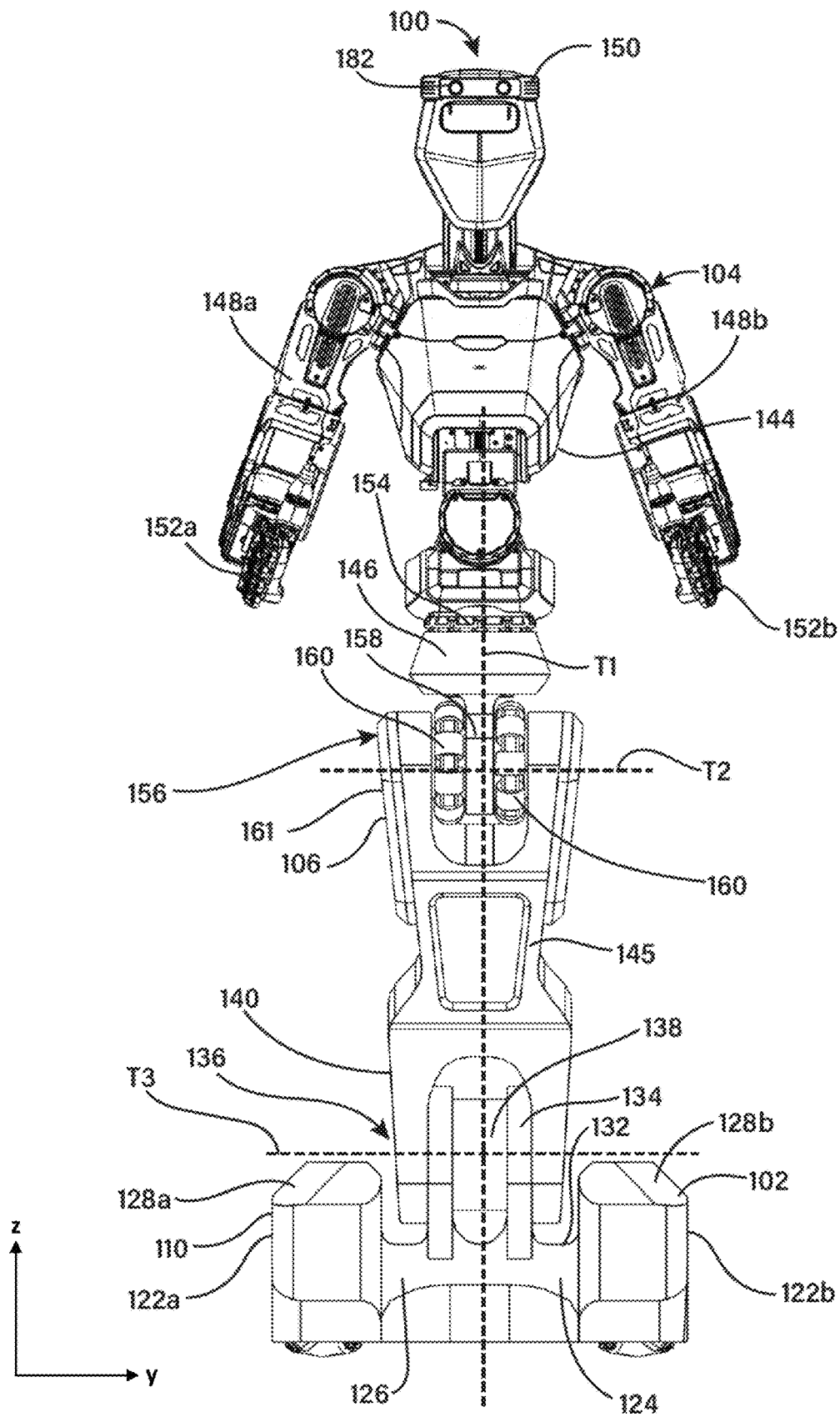
FIG. 2 is an elevated front view of the humanoid transformer robot shown in FIG. 1.

Referring to FIGS. 1 and 2, in some implementations the pedestal linkage 106 is pivotally coupled to the base body 110 of the mobile base 102 at a lower pivot joint 136 (first pivot joint) that allows the pedestal linkage 106 to be pivoted relative to the base body 110. The lower pivot joint 136 is positioned at a first end portion (an end portion or member including first end 116) of the pedestal linkage 106, which is at an end of the pedestal linkage 106 opposite from the second end portion (an end portion or member including second end 117) discussed later. In some examples, the lower pivot joint 136 can include (or be coupled to) an actuator 138 (e.g., an electric motor or other rotary actuator) that allows the lower pivot joint 136 to be controllable. In some examples, the actuator 138 is mounted on the support fixture 134 (e.g., by inserting the actuator in the aligned central openings of the support members of the support fixture). The body or housing of the actuator 138 can be fixedly attached to the support fixture 134 (or otherwise fixed relative to the base body 110). The lower end of the pedestal linkage 106 can include a yoke 140 that is coupled to the output of the actuator 138 such that operation of the actuator 138 can cause pivoting of the pedestal linkage 106 relative to the base body 110 and about the pivot axis T3 (shown in FIG. 2) in a forward or backward direction. The actuator 138 can include a non-back-drivable mechanism that prevents the output of the actuator from being used to rotate the input of the actuator. This can allow the actuator 138 to hold the lower pivot joint 136 at any given position (at any degree of pivot), even in the event of no power supply.

Figure 13:
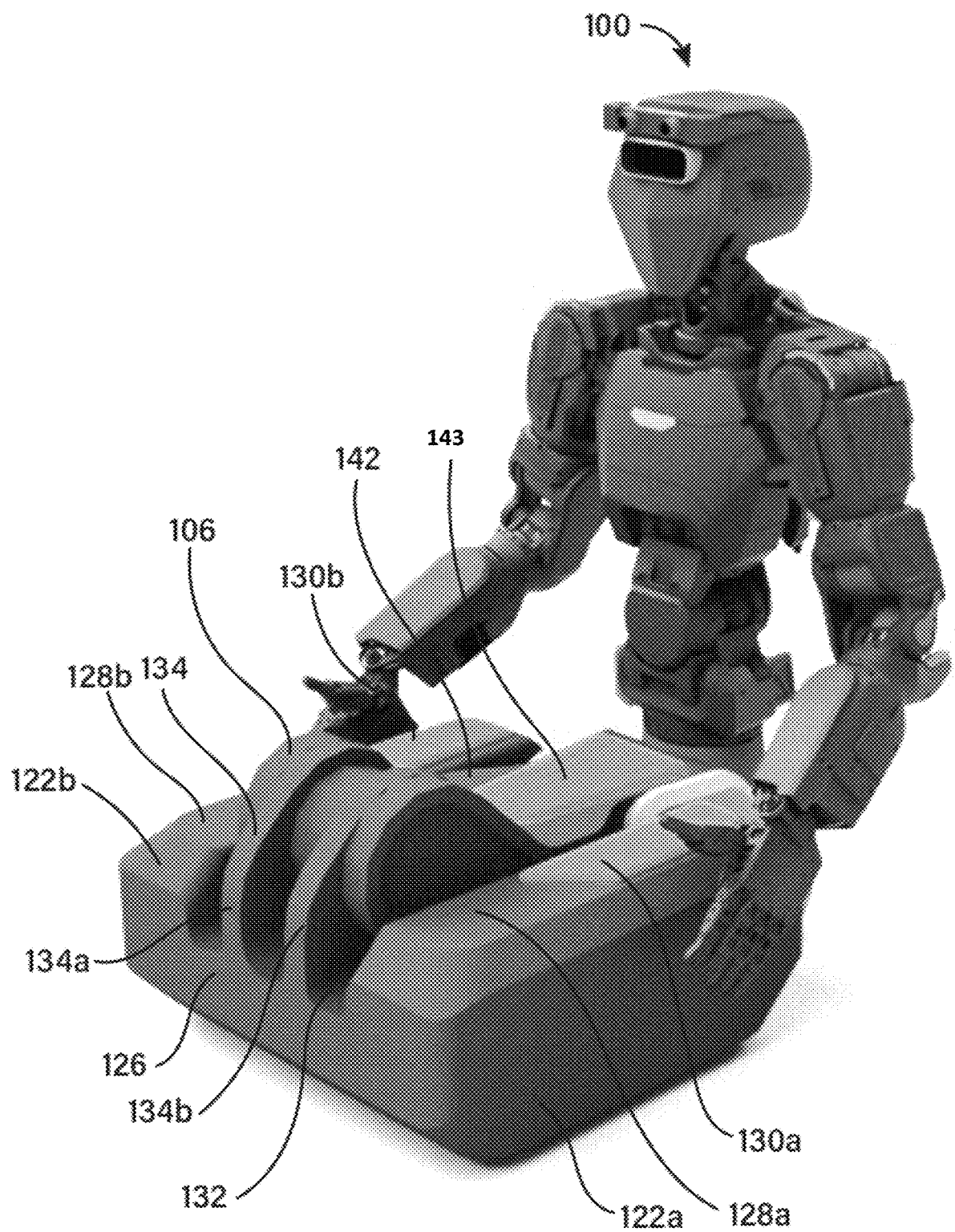
FIG. 13 is a perspective view of the humanoid transformer robot shown in FIG. 10 illustrating gripping pads on a work surface.
Figure 14:
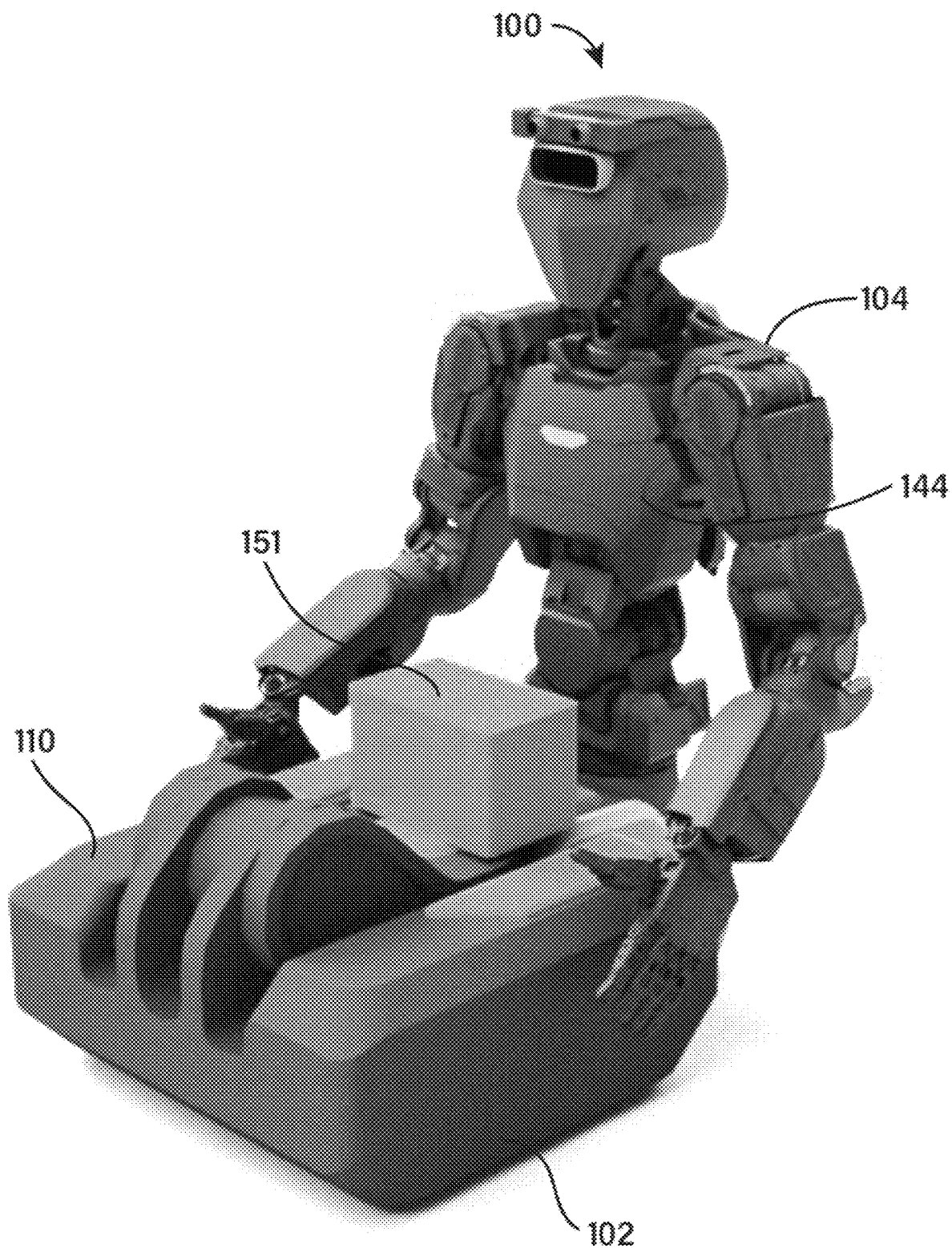
FIG. 14 is a perspective view of the humanoid transformer robot showing an object on the work surface shown in FIG. 13.

To transform the humanoid transformer robot 100 from the first configuration (e.g. the elevated configuration, the elongated configuration, or the standing configuration) to the second configuration (e.g. the lowered configuration, the collapsed configuration, or the contracted configuration or the sitting configuration), the pedestal linkage 106 can be pivoted at the lower pivot joint 136 in a forward direction towards the slot 124 in the base body 110. The pedestal linkage 106 can be rotated in the forward direction until the pedestal linkage 106 is at least partially received in the slot 124, as shown in FIGS. 6-11. In this position, the upper body 104 can be at a sitting height or approximating a sitting configuration. In some examples, in the second configuration as shown in FIGS. 13 and 14, a dorsal surface 142 of the pedestal linkage 106 (rear-facing or back surface of the pedestal linkage when robot 100 is in the first configuration) can form a portion of the work surface for the upper robot body (the top surfaces 128a, 128b of the feet portions 122a, 122b of the base body 110 can form other portions of the work surface). In some examples, the dorsal surface 142 can be generally in the same plane (coplanar) as the top surfaces 128a, 128b of the feet portions 122a, 122b when the humanoid transformer robot is in the second configuration. The width of the portion of the pedestal linkage 106 received in the slot may be selected to be approximately the same as the width of the slot 124 such that the dorsal surface 142 of the pedestal linkage 106 and the top surfaces 128a, 128b of the feet portions are approximately contiguous or congruent when the robot 100 is in the second configuration. In some examples, a non-skid material (or gripping pad) 143 (also, see FIG. 5) can be attached to the dorsal surface 142 of the pedestal linkage 106 (or a portion thereof) to provide a slip-free work surface in the second configuration.

Figure 6:
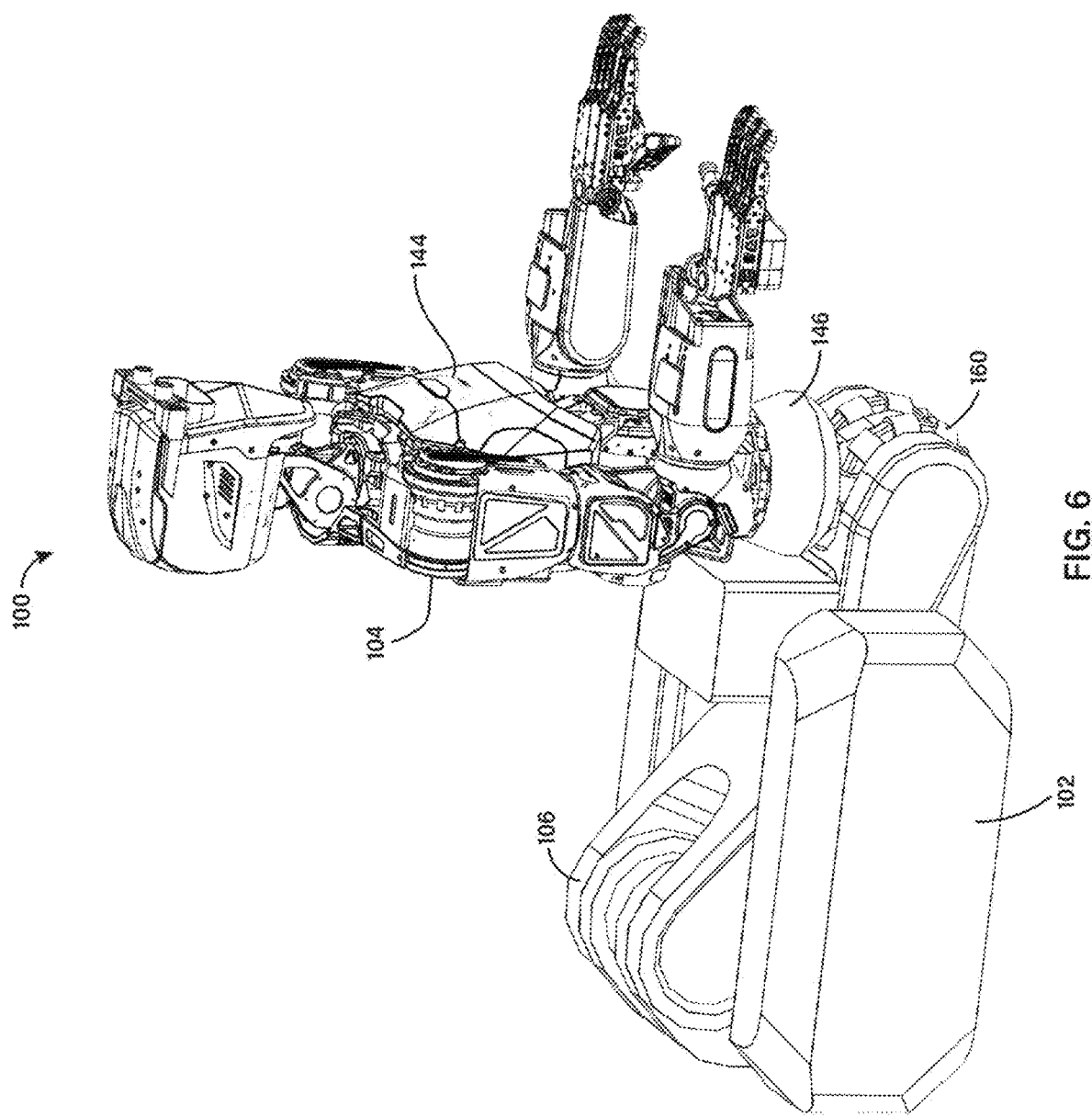
FIG. 6 is a perspective view of the humanoid transformer robot shown in FIG. 1 in a second configuration.
Figure 7:
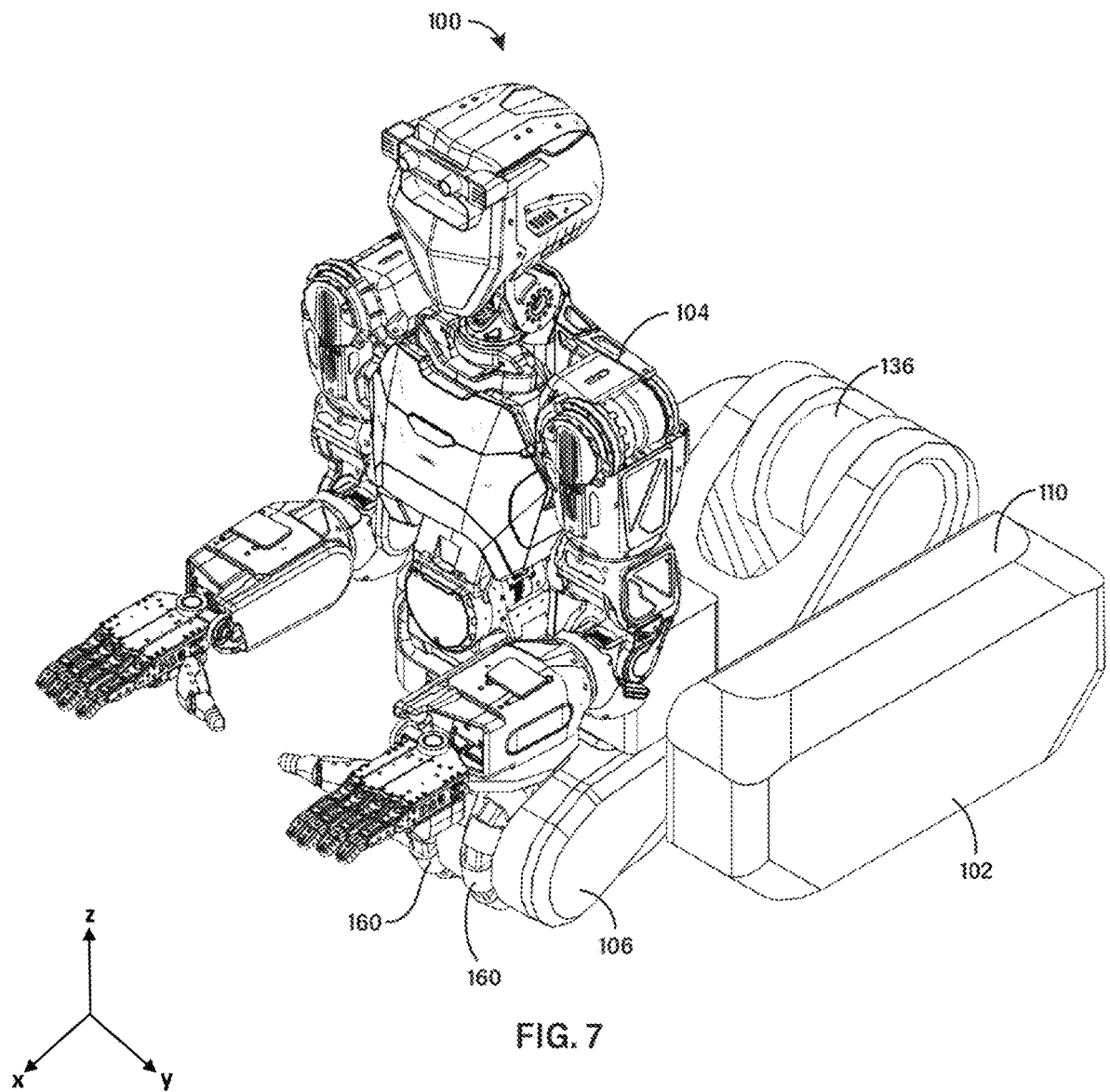
FIG. 7 is another perspective view of the humanoid transformer robot shown in FIG. 6.
Figure 8:
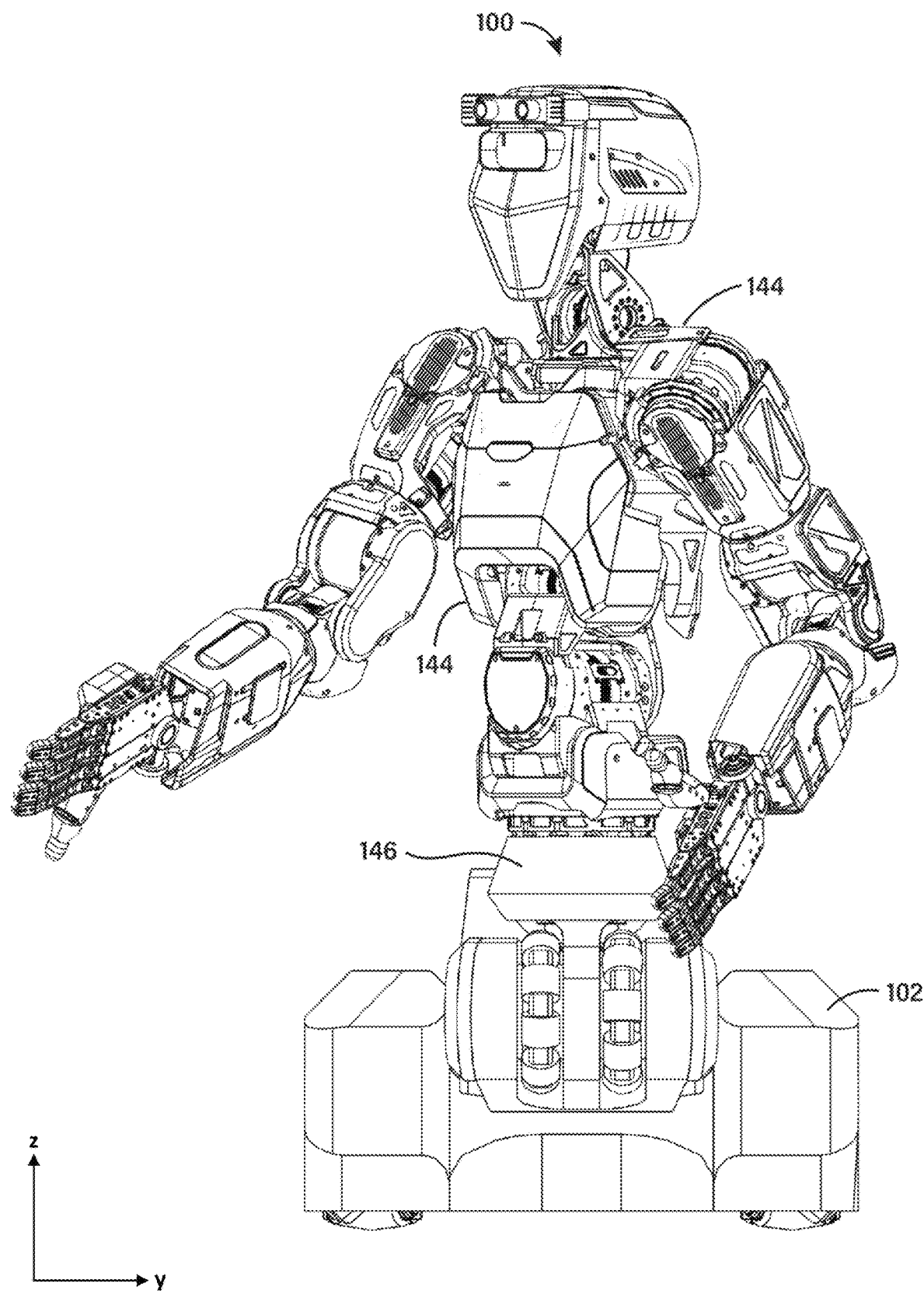
FIG. 8 is an elevated front view of the humanoid transformer robot shown in 6 with the upper robot body rotated.
Figure 9:
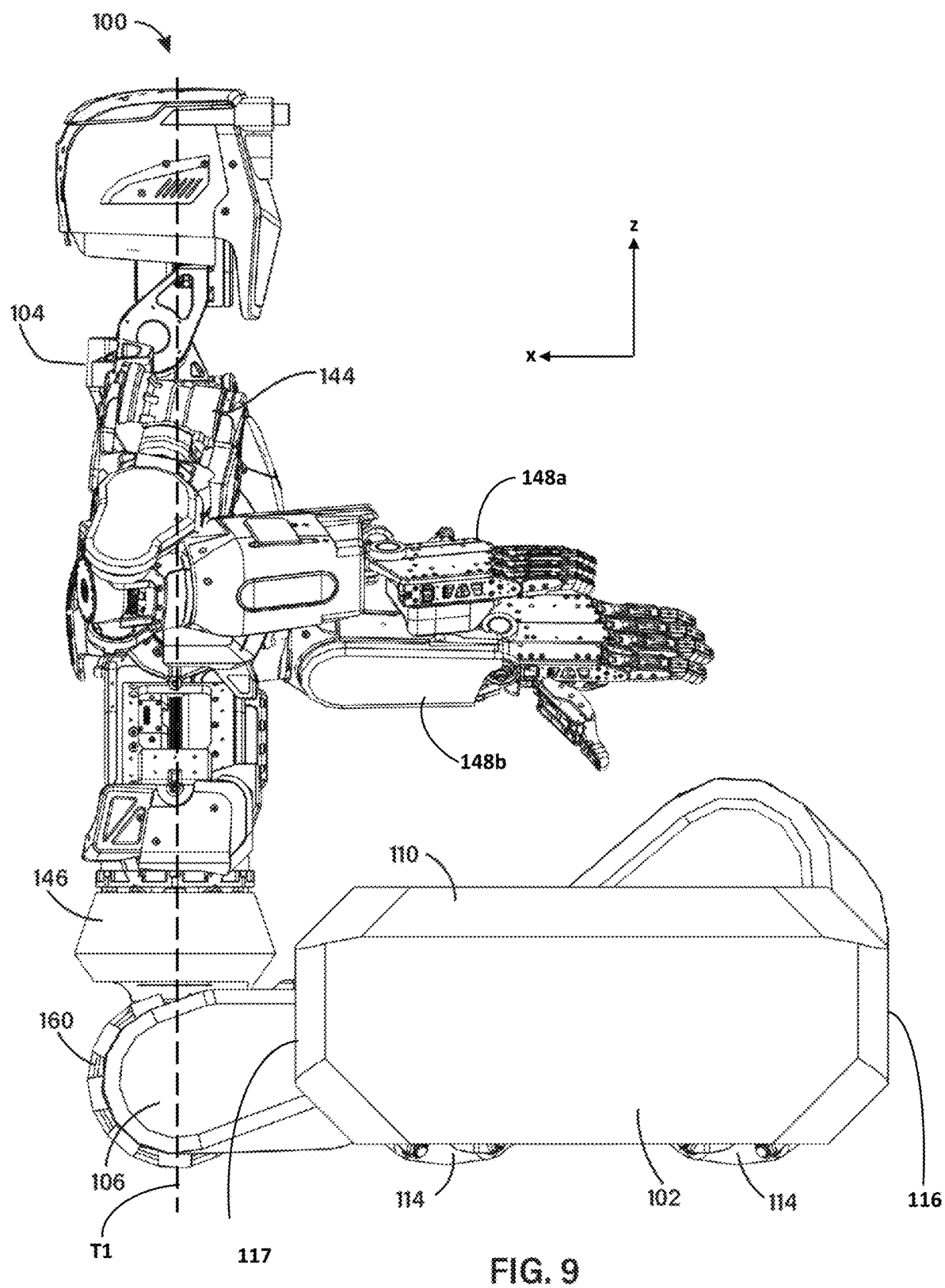
FIG. 9 is a side view of the humanoid transformer robot shown in FIG. 8.
Figure 10:
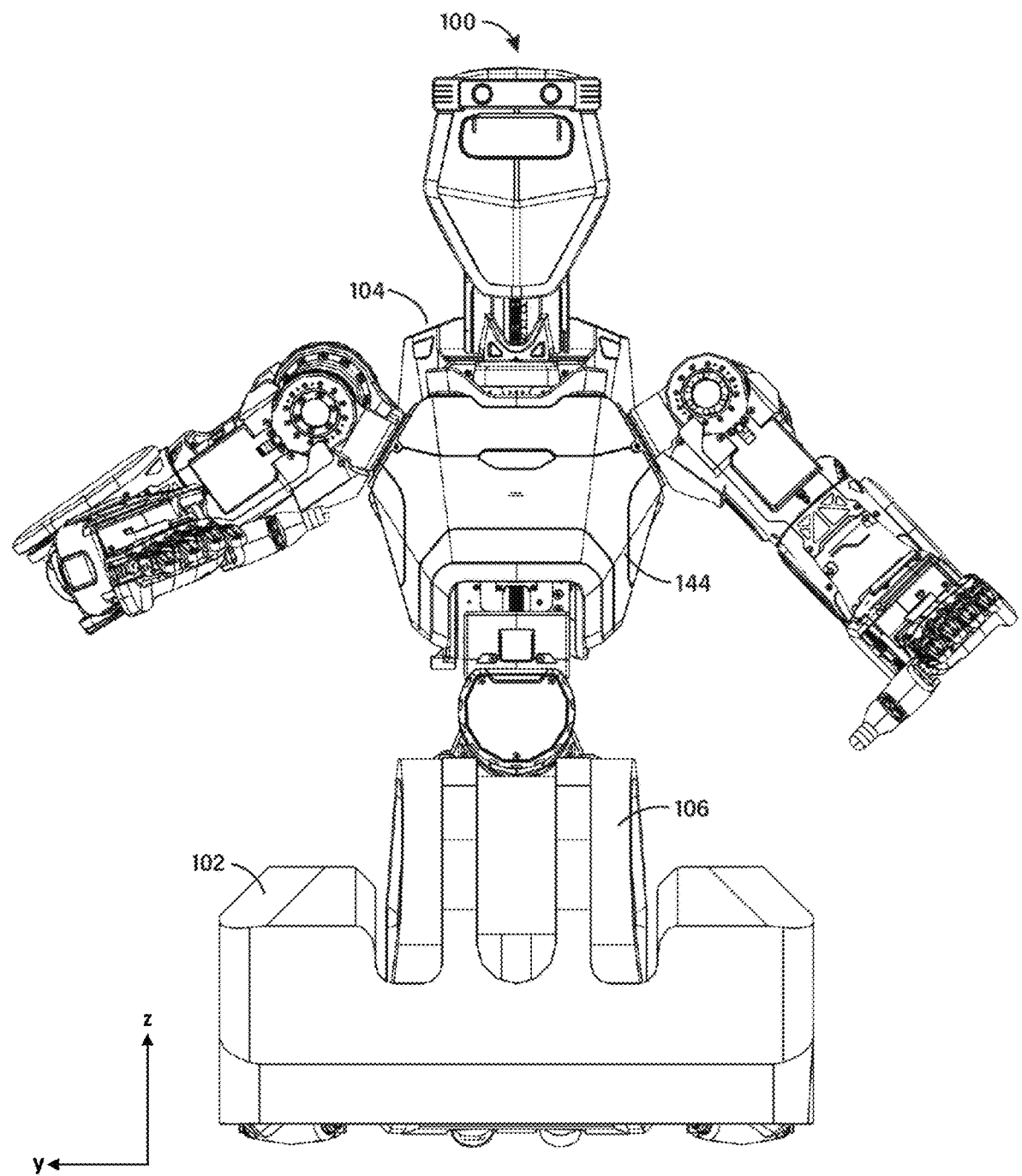
FIG. 10 is a back view of the humanoid transformer robot shown in FIG. 6 with the upper robot body rotated to face backwards.
Figure 11:
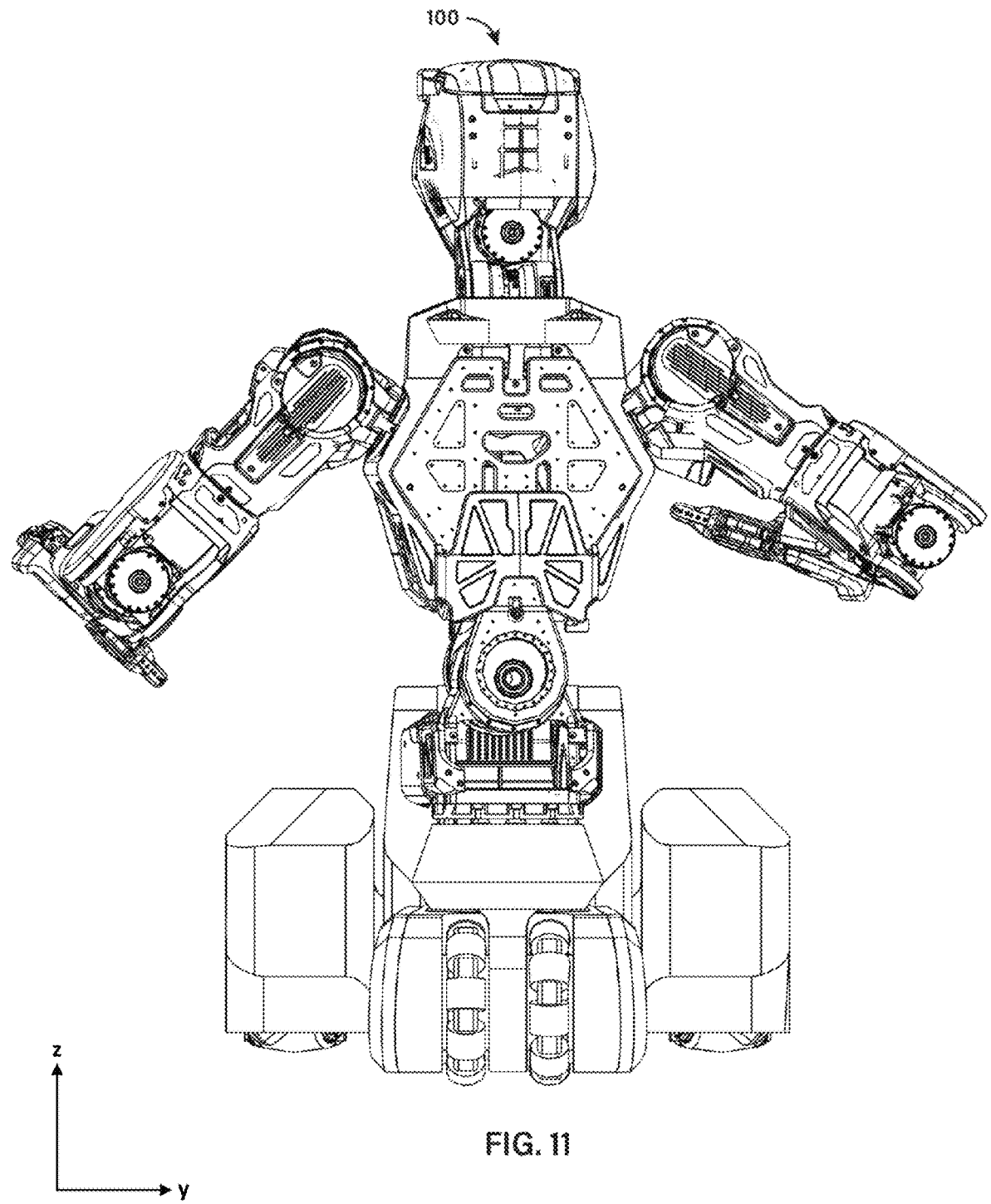
FIG. 11 is a front view of the humanoid transformer robot shown in FIG. 6 with the passive wheels engaging the ground.
Figure 15:
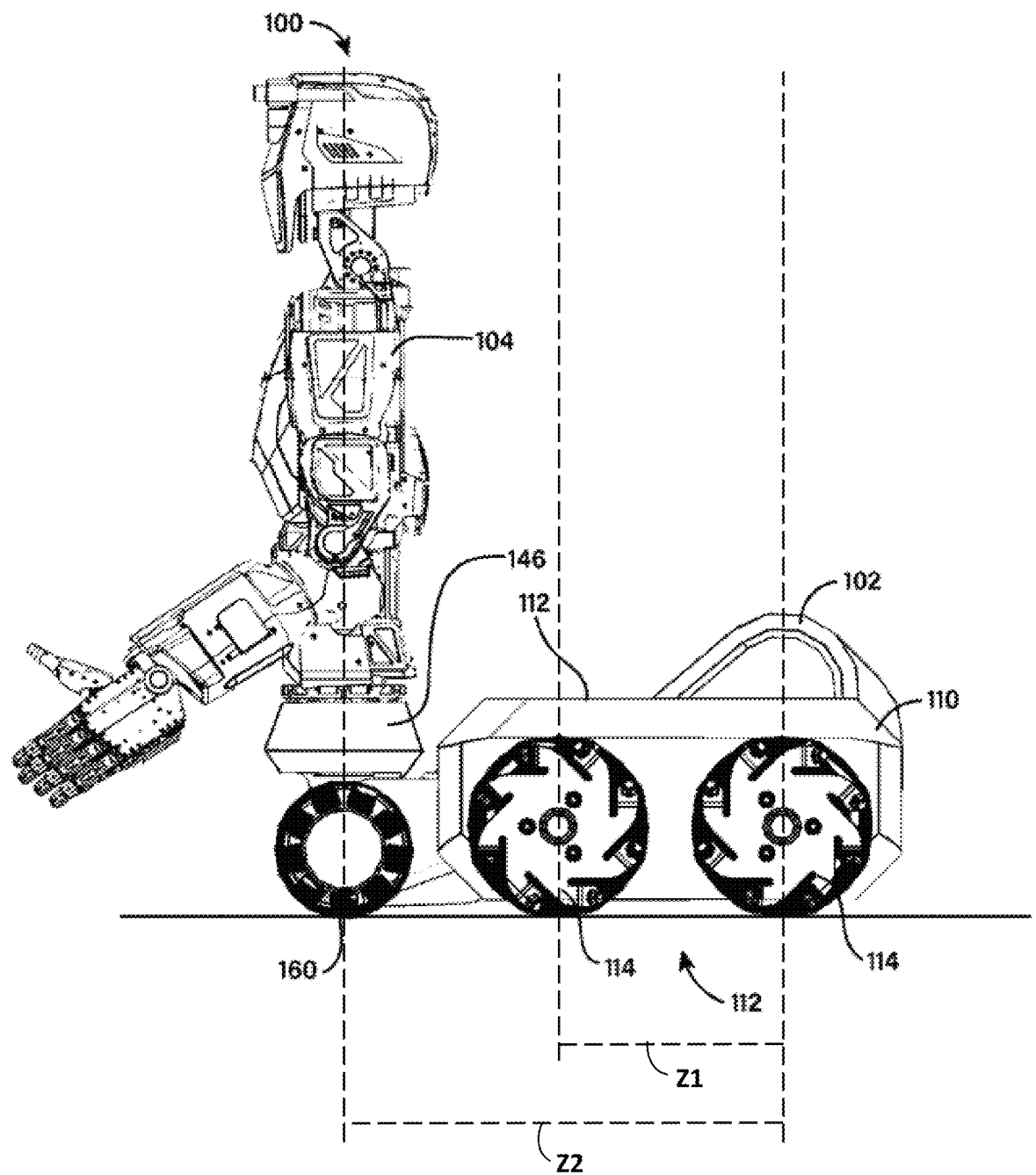
FIG. 15 is a side view of the humanoid transformer robot in a second configuration with a portion of the mobile base shown transparent to illustrate mecanum wheels and an omni wheel.

Referring to FIGS. 1 and 2, the upper body 104 can include a torso 144 coupled to a torso base 146. The upper body 104 can include arms 148a, 148b and a head 150 coupled to the torso 144. The upper body 104 can include hands 152a and 152b coupled to the arms 148a and 148b, respectively. The torso 144, arms 148a, 148b, hands 152a, 152b, and head 150 can be humanoid in form (e.g., having an appearance and/or a character resembling that of a human). The torso 144 can have a plurality of degrees of freedom that allow the torso to be configured in various poses. The torso 144 can be coupled to the torso base 146 by a rotational joint that allows the torso 144 to rotate relative to the torso base 146 and about a torso axis (T1 in FIG. 2; alternatively referred to as a rotational axis) parallel to an axial axis of the torso base 146 (the torso axis T1 or axial axis of the torso base 146 can be transverse or orthogonal to the pivot axis (T2 in FIG. 2) of the upper pivot joint 156 discussed later). The rotational joint can include an actuator 154 (e.g., an electric motor) that allows the rotational joint to be controllable. In some examples, the torso 144 can rotate through 180 degrees in opposite directions, which can allow the upper robot body 104 to face any direction in the first configuration or the second configuration. FIGS. 6-11 and 13, 14, and 15 show that the upper body can face various directions in the second configuration. In particular, FIGS. 6, 7, and 15 show upper body 104 facing forward (away from the work surface), FIGS. 9, 10, 11, 13, and 14 show upper body 104 facing backwards (towards the work surface). FIGS. 8 and 12 show the upper body rotated part-way between facing forward and facing backward. Rotation of the upper body can be used advantageously when the robot is loading objects onto the work surface (see object 151 in FIG. 14), unloading objects from the work surface, or manipulating or processing or otherwise operating on objects on the work surface. As shown in FIG. 9, the rotational axis T1 extends normal to the work surface upon which object 151 rests in FIG. 14. In this way, rotation of the torso 144 about the rotational axis T1 through at least 180 degrees in at least one (or both) directions allows the torso 144 to face towards the work surface, or away from the work surface, in the second configuration.

The pedestal linkage 106 is coupled to the torso base 146 by an upper pivot joint 156 (second pivot joint) that allows the pedestal linkage 106 to be pivotable relative to the torso base 146. The upper pivot joint 156 is positioned at a second end portion (a portion or member including second end 117) of the pedestal linkage 106, which is at an end of the pedestal linkage opposite from the first end portion (a portion of member including first end 116) discussed earlier. In some examples, the upper pivot joint 156 can include (or be coupled to) an actuator (e.g., an electric motor or other rotary actuator) (not visible in the drawings), such that the upper pivot joint 156 is controllable. In some examples, the torso base 146 includes a support fixture 158 to which the actuator of the upper pivotable joint 156 is mounted. The actuator housing can be fixedly attached to the torso base 146 (e.g., to the support fixture 158). An upper end portion of the pedestal linkage 146 can include a yoke 161 that is coupled to the output of the actuator such that rotation motion of the output of the actuator can cause pivoting of the pedestal linkage 106 relative to the torso base 146. The actuator for the upper pivot joint can include a non-backdrivable mechanism that prevents the output of the actuator from being used to rotate the input of the actuator. This can allow the actuator of the upper pivot joint 156 to hold the upper pivot joint 156 at any given position, even in the event of no power supply. In some examples, when the pedestal linkage 106 is pivoted at the lower pivot joint 136 (first pivot joint), the pedestal linkage 106 may also be pivoted at the upper pivot joint 156 to allow the torso base 146 to remain upright through the pivoting of the pedestal linkage 106.

That is, pivoting of the lower pivot joint 136 raises (elevates) or lowers a position of the upper body 104, by changing an angle of the pedestal linkage 106 with respect to the mobile base 102. In turn, pivoting of the upper pivot joint 156 counteracts tilting of torso 144 caused by pivoting of the pedestal linkage 106 at the lower pivot joint 136. In this way, the lower (first) pivot joint 136 and the upper (second) pivot joint 156 are controllable to transform the robot between the first configuration and the second configuration.

In these examples, any changes in configuration of the torso 144 may be achieved via the degrees of freedom of the torso 144 rather than via pivoting of the pedestal linkage 146.

Figure 17B:
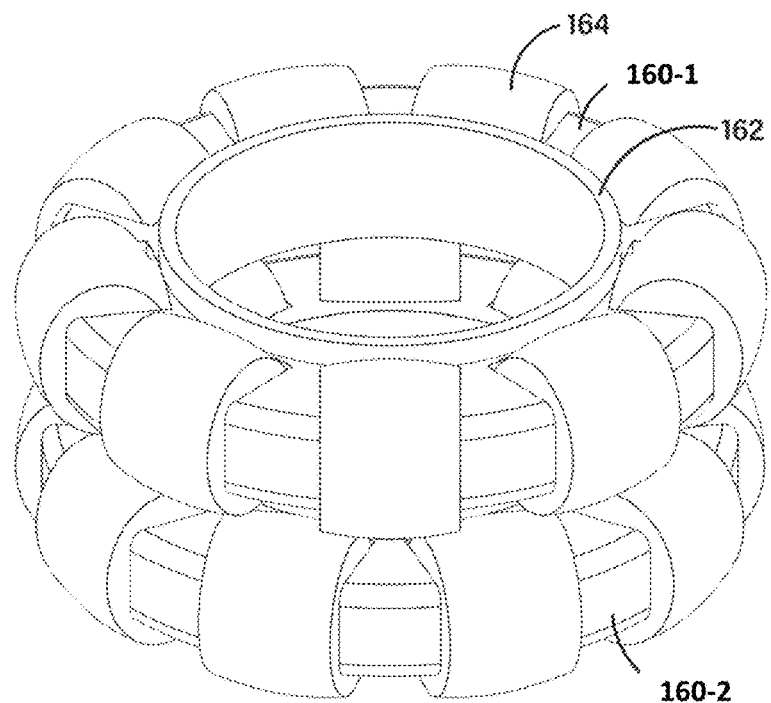
FIG. 17B is a perspective view of an omni wheel.

In some examples, one or more passive wheels 160 can be coupled to the pedestal linkage 106 (e.g., at the position of the upper pivotable joint 156, and/or at torso base 146) such that when the pedestal linkage 106 is rotated to the position in which the pedestal linkage 106 is received in the slot 124 (see, for example, FIG. 7 where the robot 100 is in the second configuration), the one or more passive wheels 160 can engage the ground and provide additional stability for the upper robot body 104. In some implementations, the passive wheels can be omni wheels, which are also omnidirectional wheels. As shown in FIG. 17B, an omni wheel (e.g. 160-1) can include a hub 162 and a series of rollers 164 mounted at a circumference of the hub 162 (which is similar to the mecanum wheel) (two omni wheels 160-1 and 160-2 are stacked on top of each other in the example shown in FIG. 17B). The rollers 164 shown in the omni wheel 160-1 are perpendicular to the turning direction. The effect is that the wheel can be driven with full force but will also slide laterally with great ease. Alternatively, the wheel can rotate passively around the hub 162, and the rollers 164 can rotate passively around axes tangential to a rotation axis of hub 162. In this way, the omni wheel can rotate passively in multiple directions. In the context of robot 100, the omni wheels (or passive wheels) 160-1 and 160-2 (collectively 160) are passive in that they are not driven by motors. The passive wheels 160 can have the effect of increasing a zone of stability in which the center of gravity of the robot would need to fall for a stable system when the robot body is in the second configuration. In FIG. 15, the line Z1 shows the approximate location of the zone of stability before the passive wheels 160 engage the ground (or without the passive wheels 160). The line Z1 extends between where front wheels 114 and rear wheels 114 engage a ground surface. In FIG. 15, the line Z2 shows the approximate location of the zone of stability after the passive wheels 160 engage the ground. The line Z2 extends between where rear wheels 114 engage the ground surface and where passive wheels 160 engage the ground surface, where the line Z2 is longer than the line Z1. That is, passive wheels 160 effectively increase a footprint of robot 100 which contacts the ground when robot 100 is in the second configuration, thereby making robot 100 more stable on the ground, and more difficult to tip over. While the passive wheels 160 engage the ground and the robot is in the second configuration and not in need of mobility, the base motors that drive the mecanum wheels 114 may be deactivated.

Figure 3:
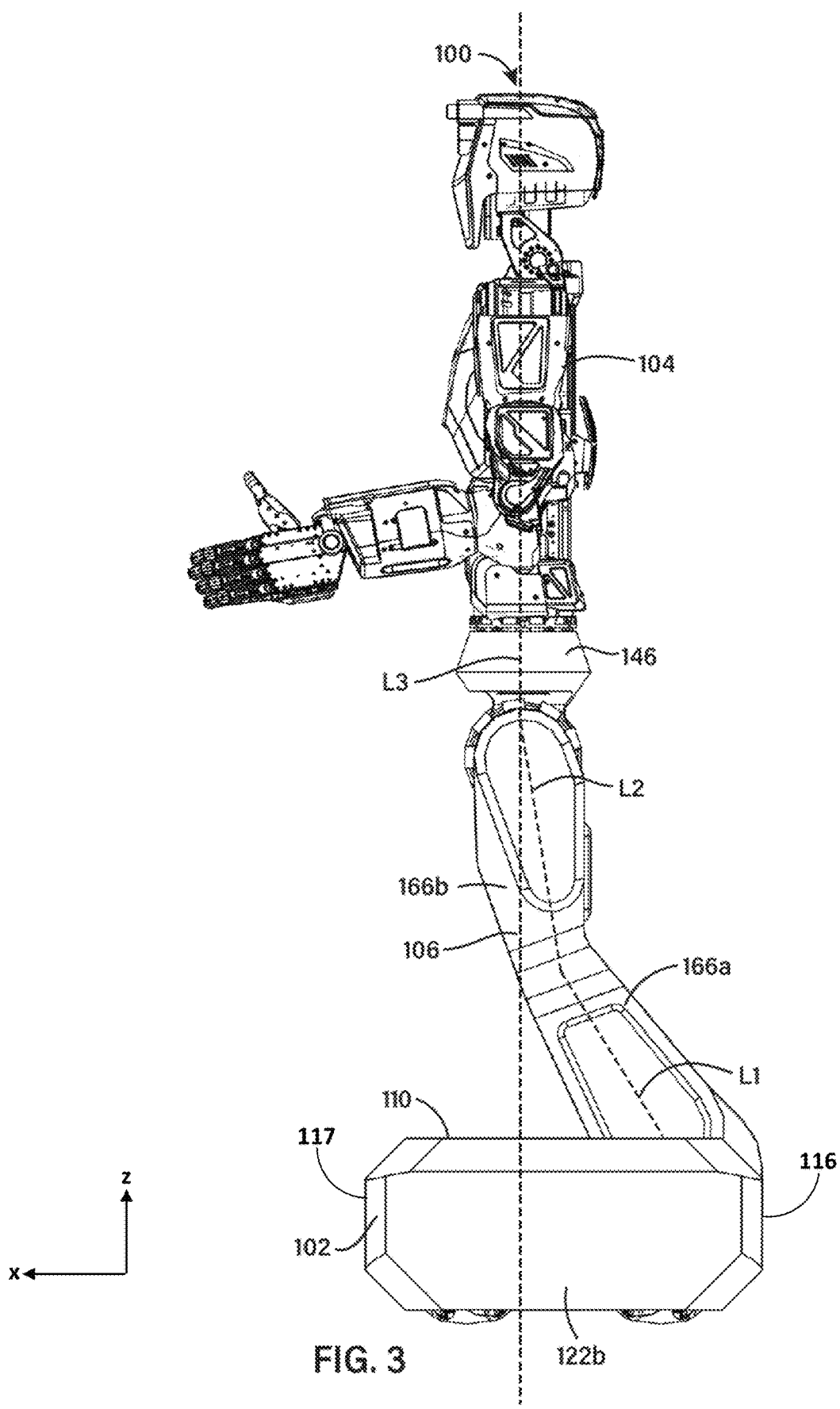
FIG. 3 is an elevated side view of the humanoid transformer robot shown in FIG. 1.
Figure 4:
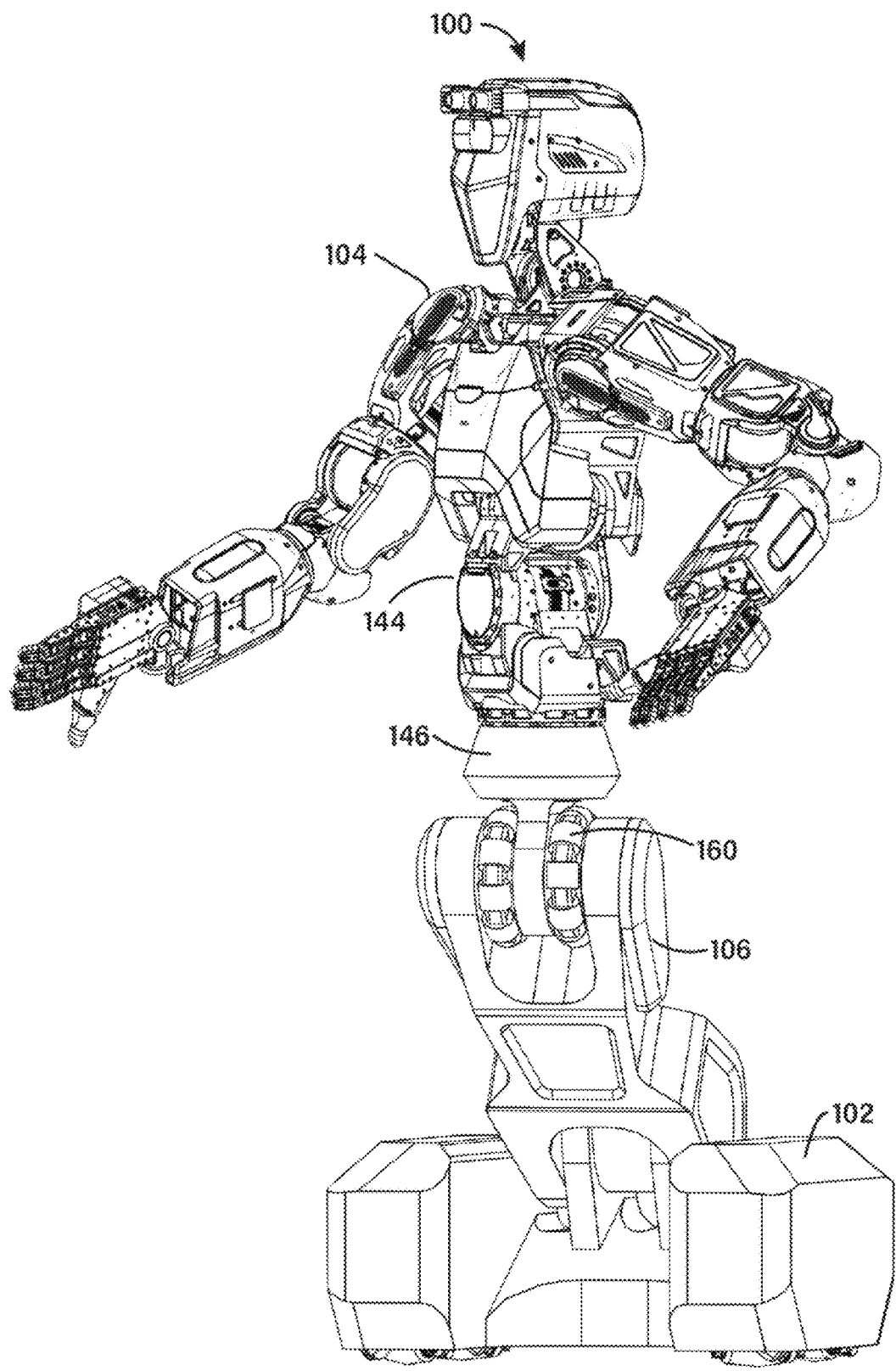
FIG. 4 is a perspective view of the humanoid transformer robot shown in FIG. 1 with the upper robot body rotated.
Figure 5:
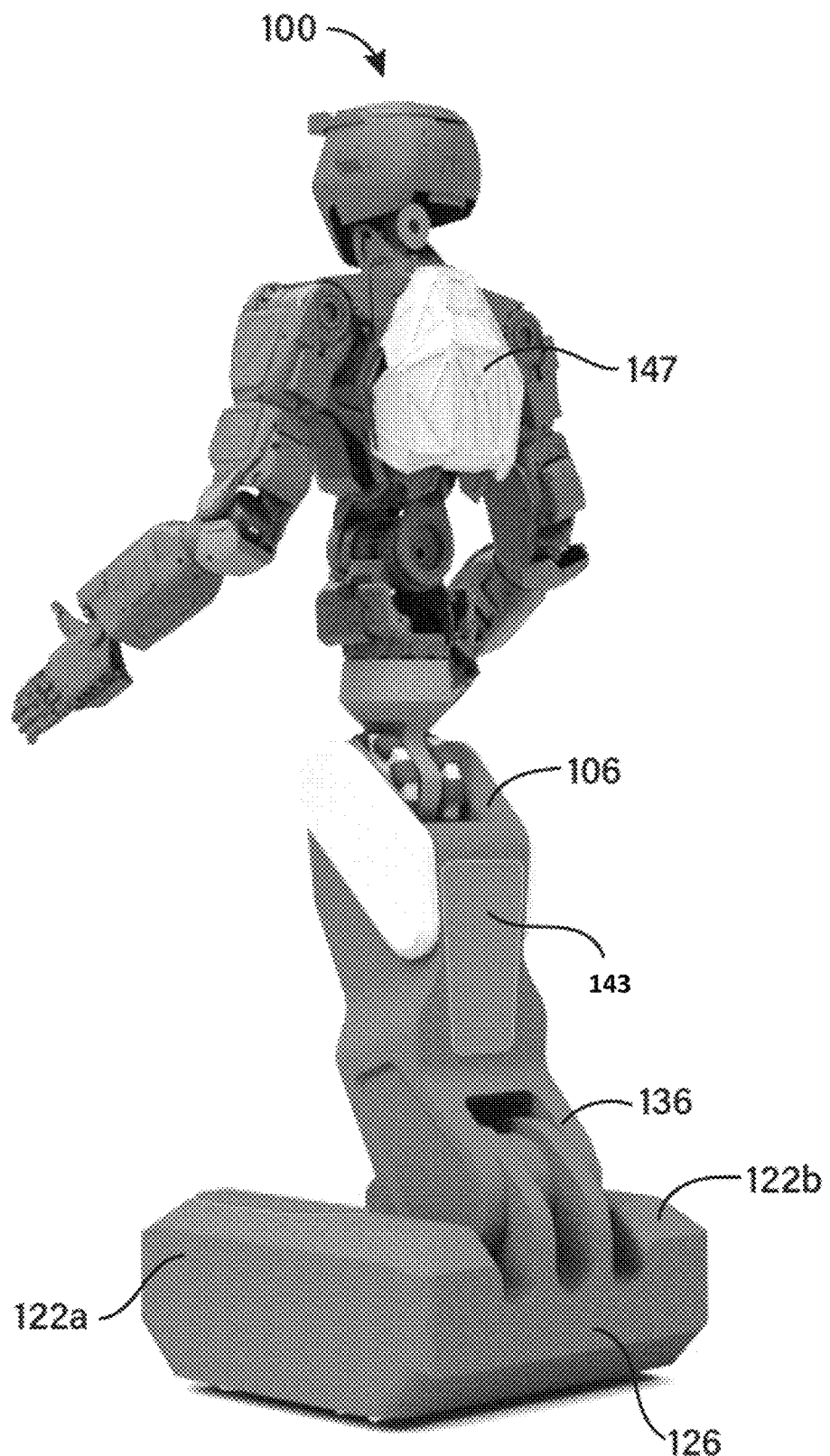
FIG. 5 is a perspective back view from the back of the humanoid transformer robot shown in FIG. 1.

Referring to FIG. 3, the pedestal linkage 106 can include a lower part 166a (first end portion) that is coupled to the mobile base 102 and an upper part 166b (second end portion) that is coupled to the torso base 146. In some examples, the pedestal linkage 106 can be angled (e.g., a longitudinal axis L1 of the lower part 166a is not parallel to the longitudinal axis L2 of the upper part 166b, or an angle between the upper part 166b and the lower part 166a is not 180 degrees). The pedestal linkage 106 can be angled such that when the pedestal linkage 106 supports the upper body 104 in the first configuration, the line of gravity of the upper body 104 (shown approximately at L3) can generally extend through a center of the mobile base 102 (or the upper body 104 is offset from the edge of the mobile base 102), which can have the effect of centering the weight of the upper body 104 on the mobile base 102 and increasing the stability of the system in the first configuration. That is, the first end portion can extend in a first direction L1, and the second end portion can extend in a second direction L2 which is non-parallel to the first direction, to align a center of gravity of the upper body 104 over the mobile base 102 when the robot is in the first configuration.

As labelled in FIG. 3, base body 110 of mobile base 102 can have a first end 116 and a second end 117 opposite the first end. The lower pivot joint 136 (the first pivot joint) is positioned at the first end 116 of base body 110. When the robot 100 is in the first configuration (as shown in at least FIG. 3), the upper body 104 is positioned above the mobile base 102 between the first end 116 and the second end 117. When the robot 100 is in the second configuration (shown in at least FIG. 9), the upper body 104 (namely torso base 146 of torso 144) is positioned adjacent the second end 117 of the base body 110 of mobile base 102, opposite the first end 116.

In some scenarios, the pedestal linkage 106 can be utilized to overcome a curb or step. In particular, the robot 100 can approach the curb in the first configuration, such that the curb is positioned in a path of the upper pivot joint 156 when the pedestal linkage 106 is lowered. Robot 100 can then actuate the first pivot joint 136 to transform robot 100 towards the second configuration, such that the pedestal linkage (at or around the second pivot joint 156) makes contact with the curb. Continuing the transformation to the second configuration will result in the second end 117 of the base body being lifted off the ground, to the height of the curb. The robot 100 can then drive itself forward via the rear active wheels (wheels at the first end 116 of the base body), until the front active wheels are in contact with the curb. The robot 100 can then drive itself forward via the front active wheels (wheels at the second end 117 of the base body), until the robot 100 is positioned atop the curb.

FIGS. 1, 2, 3, 7, 8, 9, 10 and 11 illustrate a coordinate frame showing x, y, and z directions, relative to mobile base 102 of the robot body. Throughout this disclosure, the x-direction extends longitudinally back-to-front of the mobile base 102, the y-direction extends laterally across the mobile base 102, and the z-direction extends vertically normal to a ground surface on which the mobile base is positioned. An implementation is discussed below with reference to these Figures, and with particular reference to this coordinate frame.

In this exemplary implementation, the mobile base 102 is positioned in an xy-plane extending in the x-direction and the y-direction. That is, the mobile base 102 extends generally horizontally over a ground surface. The upper body 104 is positioned in an xz-plane; that is, the upper body generally extends across the mobile base and vertically away from the ground surface. The pedestal linkage 106 is positioned in the xz-plane, and is coupled to mobile base 102 at the lower pivot joint 136 (first pivot joint). The pedestal linkage 106 is pivotable in the xz-plane about a first y-axis (a pivot axis of the lower pivot joint 136). The pedestal linkage 106 is also coupled to the torso 144 (of upper body 104) at the upper pivot joint 156 (second pivot joint). The pedestal linkage 106 is also pivotable at the upper pivot joint 156 in the xz-plane about a second y-axis (a pivot axis of the upper pivot joint 156).

In the first configuration, the pedestal linkage 106 is pivoted (at the lower pivot joint 136) to position at least a portion of the pedestal linkage 106 out of and non-parallel to the xy-plane. That is, the pedestal linkage 106 is pivoted to elevate at least a portion of the pedestal linkage 106 above the xy-plane, thereby elevating torso 144 (e.g., to towards approximately a standing height).

In the second configuration, the pedestal linkage 106 is pivoted (at the lower pivot joint 136) to position the at least a portion of the pedestal linkage co-planar or parallel to the xy-plane. That is, the pedestal linkage 106 is pivoted to lower the at least a portion of the pedestal linkage into the xy-plane with the mobile base 102 (e.g. lower the pedestal linkage 106 into the slot 124).

The pedestal linkage 106 is pivotable relative to the torso 144 at the second pivot joint 156 to counteract tilting of the torso 144 due to pivoting of the pedestal linkage 106 at the first pivot joint 136. In this way, the upper body 104 (or torso 144) can be maintained approximately vertical or parallel to a yz plane in both the first configuration and the second configuration (and any position between the first configuration and the second configuration).

The pedestal linkage 106 can have a first length which spatially separates the first y-axis (the pivot axis of the lower pivot joint 136) and the second y-axis (the pivot axis of the upper pivot joint 156) in the xz-plane. The lower pivot joint 136 (the first pivot joint) is positioned at a first end of the mobile base 102 (first end 116 shown in FIG. 1), and the mobile base 102 has a second end opposite the first end (second end 117 in FIG. 1). The distance between the first end 116 and the second end 117 of the mobile base 102 is of a second length, which is less than or equal to the first length of the pedestal linkage 106. In this way, when the robot 100 is in the second configuration, the upper body 104 is positioned at or adjacent a periphery of the mobile base 102 (base body 110). That is, the pedestal linkage 106 is the same length as or longer than the mobile base 102, such that when the robot 100 is in the second configuration, the upper body 104 is positioned at a location extending at or beyond the boundaries of the mobile base itself, as shown in at least FIGS. 6, 7, and 9.

The pedestal linkage which couples a mobile base to an upper body in a robot does not necessarily have to include pivot joints, but instead can be controllable by any appropriate means to transform a robot between a first configuration and a second configuration. An alternative exemplary means is shown in FIGS. 20 and 21, and discussed below.

Figure 20:
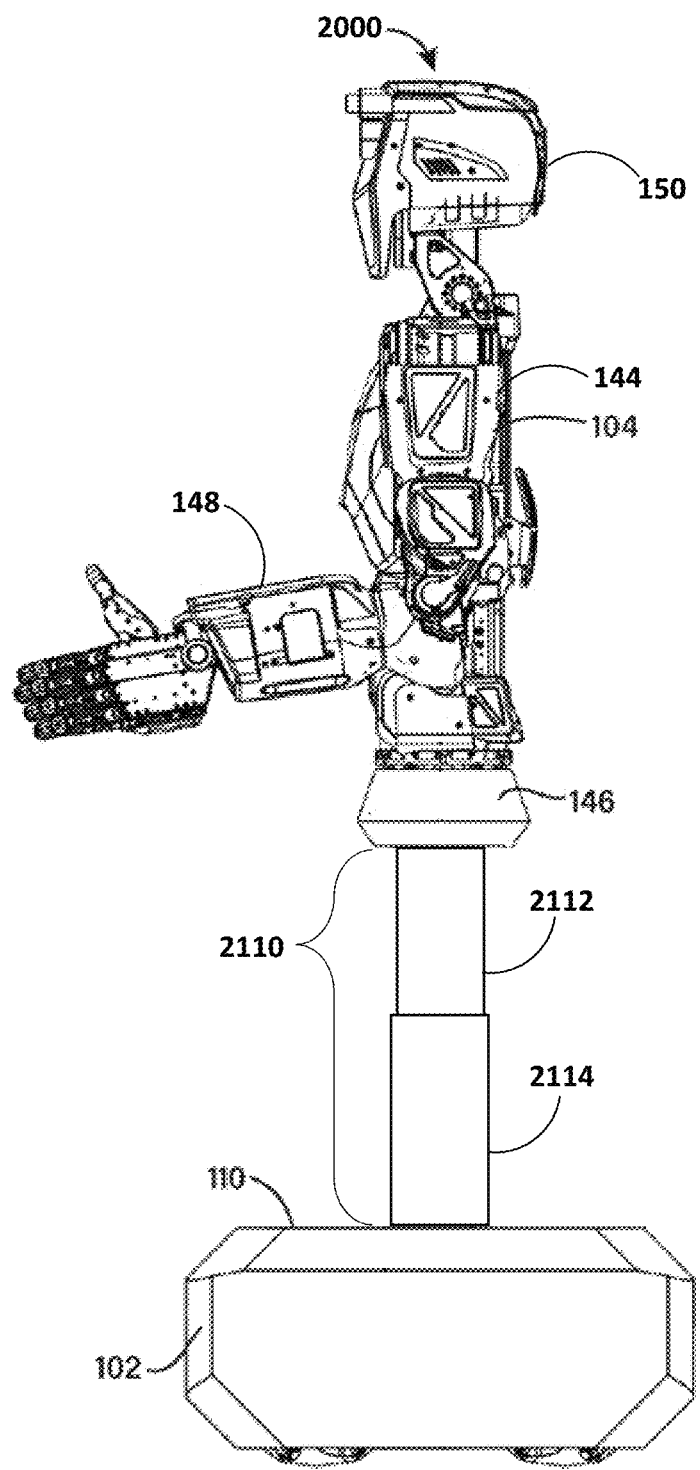
FIG. 20 is an elevated side view of a humanoid transformer robot in a first configuration.
Figure 21:
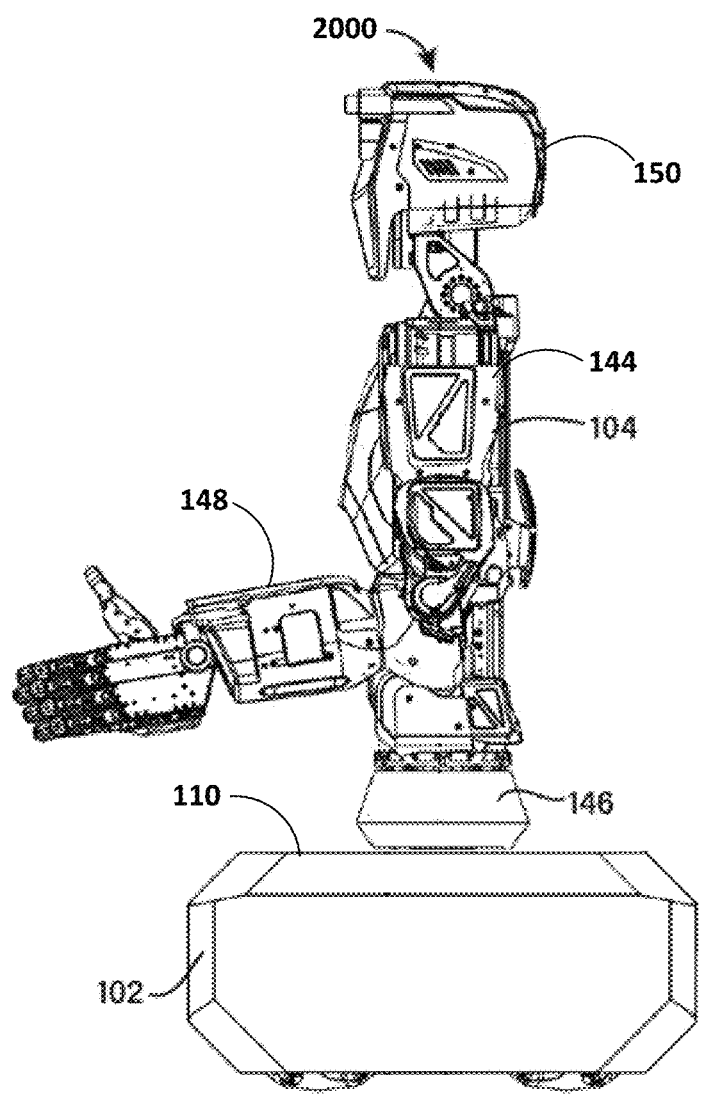
FIG. 21 is an elevated side view of a humanoid transformer robot in a second configuration.

FIGS. 20 and 21 are side-views of an exemplary robot 2000. Robot 2000 is similar in at least some respects to robot 100 discussed throughout this disclosure, and discussion of robot 100 is applicable to robot 2000 unless context dictates otherwise. For example, robot 2000 includes many common components with robot 100, including mobile base 102, upper body 104, base body 110, torso 144, torso base 146, at least one arm 148, and head 150. Discussion of these components is not repeated for brevity, and robot 2000 can include any other appropriate components in robot 100.

One difference between robot 2000 and robot 100 is that robot 2000 does not utilize a pivoting pedestal linkage. In robot 2000, base body 110 of mobile base 102 is coupled to torso base 146 of upper body 104 by a telescoping pedestal linkage 2110, including members 2112 and 2114. Additional members could be included in the telescoping pedestal linkage 2110 as appropriate for a given application.

FIG. 20 shows robot 2000 in a first configuration, where the upper body 104 is elevated (relative to a second configuration). FIG. 21 shows robot 2000 in the second configuration, where the upper body 104 is lower than in the first configuration. To transform from the first configuration to the second configuration, telescoping pedestal linkage 2110 is actuated to lower in or contract upon itself. In particular, member 2112 can retract into member 2114. Further, members 2112 and/or 2114 can in some implementations retract into the upper body 104 and/or base body 110. This is why the telescoping pedestal linkage 2110 is not visible in FIG. 21. To transform from the second configuration to the first configuration, telescoping pedestal linkage 2110 is actuated to extend or lengthen. In particular, member 2112 can extend out from member 2114. Further, members 2112 and/or 2114 can in some implementations extend out of the upper body 104 and/or base body 110.

In an alternative implementation, robot 2000 could translate up and/or down a static pole or other member by a climbing mechanism, instead of using a telescoping linkage.

In some examples, one or more energy storage device(s) (e.g., battery or supercapacitor) can be integrated in a body of the pedestal linkage 106 (e.g., a portion 145 of the pedestal linkage between the yokes 140, 161 as shown in FIG. 2). The energy storage device(s) in the pedestal linkage can be connected to a power distribution system of the humanoid transformer robot and can provide electrical power to components of the humanoid transformer robot. In some examples, the weight of the energy storage device(s) in the pedestal linkage and the weight of the base motors and wheels in the mobile base can further increase a zone of stability of the system, allowing support of a heavier upper robot body.

Figure 19:
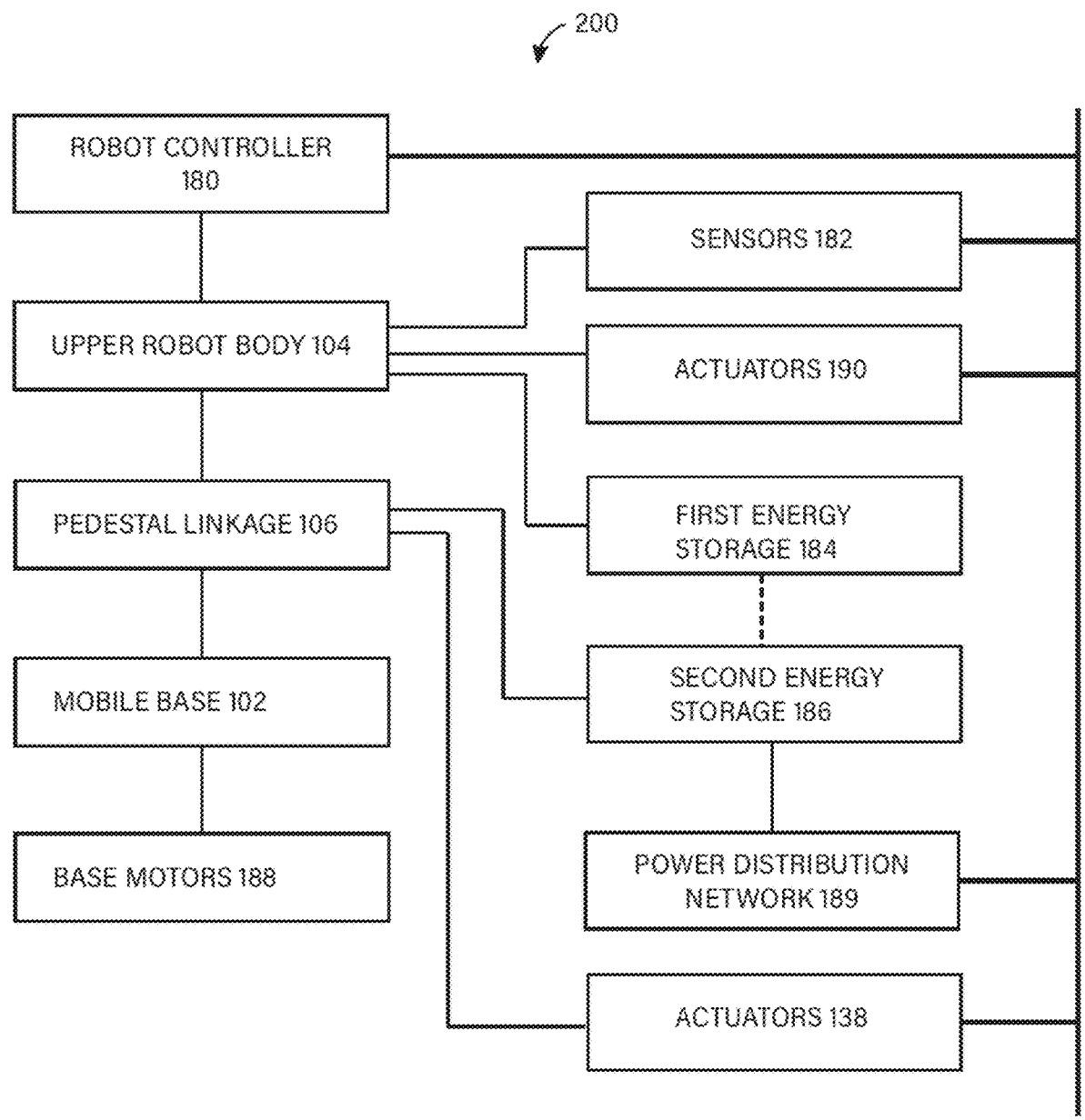
FIG. 19 is a system diagram of a humanoid transformer robot.

FIG. 19 is a system diagram 200 of the humanoid transformer robot 100. The humanoid transformer robot 100 can include a robot controller 180 that manages robot operations. The robot controller 180 may be housed in (or otherwise coupled to the) upper body 104 (e.g., coupled to or housed in the torso 144). The robot controller 180 can include one or more processors and one or more non-transitory processor-readable storage media communicatively coupled to the one or more processors. The one or more non-transitory processor-readable storage media can store data and programs that can be executed to perform various functions of the mobile robot. The robot controller 180 can include a communication interface to enable the robot controller 180 to communicate with various components in the system (e.g., sensors 182 and actuators 190, 138) and to communicate with external systems (e.g., a fleet system or a teleoperation system).

The humanoid transformer robot 100 can include sensors 182 that collect information about the environment or physical state of the humanoid transformer robot 100. The sensors 182 may be mechanically coupled to the upper robot body 104. The sensors 182 can include, for example, one or more vision sensors (e.g., cameras, LiDAR sensors, and/or radar sensors), proximity sensors, audio sensors, tactile sensors, accelerometers, inertial sensors, gyroscopes, temperature sensors, humidity sensors, or radiation sensors. In some examples, some of the sensors 182 may be coupled to one or both of the mobile base 102 and pedestal linkage 106. For example, there can be sensors at the pivot joints 136, 156 that allow tracking of the positions of the pivot joints or sensors on the mobile base 102 that provide vision data from the viewpoint of the mobile base 102. The sensor data collected by the sensors 182 can be used to enable various functionalities of the humanoid transformer robot. For example, the data collected from vision sensors can allow the humanoid transformer robot 100 to navigate an environment autonomously on the mobile base 102.

The humanoid transformer robot 100 can include a first energy storage device 184 (e.g., battery or supercapacitor) coupled to the pedestal linkage in any suitable manner. For example, the pedestal linkage 106 can have a compartment in which the first energy storage device 184 is mounted (e.g. portion 145 discussed earlier). The compartment may have an access door that allows the first energy storage device 184 to be hidden from view during normal use and replaceable or serviceable when needed. The pedestal linkage 106 can have additional features (e.g., fins) that facilitate dissipation of heat from the first energy storage. In some examples, the pedestal linkage 106 can include an electrical port that is electrically coupled to the first energy storage and through which the first energy storage can be charged. A suitable cover can be disposed over the electrical port when not in use. The robot 100 can in some implementations initiate self-charging, by grasping a charge plug (e.g. with hands 152a or 152b) and plugging it into the electrical port. The first energy storage device 184 in the pedestal linkage 106 may be used to power electrical components (or a subset of electrical components) in the humanoid transformer robot, such as the base motors that operate the active wheels 114 in the mobile base 102 and the actuators in the pivotable joints 136, 156 between the pedestal linkage and the mobile base and upper robot body.

The humanoid transformer robot 100 can include a second energy storage device 186 (e.g., battery or supercapacitor) coupled to the upper body 104 in any suitable manner. For example, the second energy storage device 186 may be provided in a backpack that is attached to the torso 144 (see backpack 147 in FIG. 5). The second energy storage device 186 may power electrical components in the upper robot body 104. In some examples, the first energy storage device 184 may have a larger capacity compared to the second energy storage device 186. In some examples, the first energy storage device 184 may power electrical components in the upper body 104 when the second energy storage device 186 is unavailable for use. In some examples, the first energy storage device 184 may charge the second energy storage device 186 when the storage capacity of the second energy storage device 186 is low. In some implementations, backpack 147 can have an LED strip positioned thereon which indicates a charge level of energy storage device 186 and/or the energy storage device 184. In some implementations, a bar, guardrail, or cage can be positioned on torso 144 which extends further than backpack 147, to act as a bumper to prevent impact to backpack 147.

The robots herein could also be equipped with one or more lights (e.g. positioned at torso 144. In an example, such lights could be positioned and oriented to project patterns on a ground surface, which can be indicative of intentions of the robot 100 (e.g. turn signals, routes, etc.). In another example, such lights could be positioned and oriented so as to illuminate a travel direction or work area (e.g. workbench or shelf) where the robot is working. Such lights could also be selectively used to illuminate a scene and cast shadows, which can in turn be analyzed by an imaging system of the robot to characterize the environment.

In some implementations, the robots herein could be equipped with one or more LIDAR units. For example, torso 144 could include a LIDAR unit facing forward and a LIDAR unit facing backward, such that the robot can perform environment analysis (e.g. SLAM) in both the first and second configurations, and when the torso 144 is facing forward or backward. Additional LIDAR units could be positioned on the base body 110 to further increase LIDAR coverage and environmental awareness of the robot.

In some implementations, a "load" carried by the robots discussed herein could be a human. That is, a human could use a robot as a vehicle, by climbing onto a work surface of the robot.

In some examples, the first energy storage device 184 and the second energy storage device 186 may be connected to a power distribution network 189 (e.g., a bus) that extends through the humanoid transformer robot 100. One or more electrical devices (e.g., robot controller 180, base motors 188 that drive the mecanum wheels 114 of the mobile base 102, actuators 138 in the pivot joints coupling the pedestal linkage 106 to the mobile base 102 and upper body 104, actuators 190 that operate various degrees of freedom in the upper body 104, and sensors 182) of the humanoid transformer robot can be connected to the power distribution network 189 and powered by either the first energy storage device 184 or the second energy storage device 186. The humanoid transformer robot 100 may include one or more charging interfaces for the first energy storage device 184 and the second energy storage device 186.

The robot controller 180 manages operations of the humanoid transformer robot 100 and may do so in cooperation with external processing systems. For example, the robot controller 180 can generate joint trajectories that are used to control the actuators 138 and 190 (and/or other actuators such as 154 discussed earlier). The robot controller 180 can receive sensor data from the sensors 182 and use the sensor data to make decisions of the humanoid transformer robot, monitor power status of the humanoid transformer robot, receive tasks to be performed by the humanoid transformer robot, control the humanoid transformer robot to perform the tasks, including navigating within an environment as needed for performance of the tasks, and communicate robot operation data to other systems (e.g., a fleet system).

In some examples, the upper body 104, the pedestal linkage 106, and the mobile base 102 may be controlled using a whole body controller. In some examples, the humanoid transformer robot can include an autonomous navigation function that takes sensor data (e.g., data from vision sensors) and generates movement commands that may be translated to control signals for the base motors 188 that drive the active wheels 114. The autonomous navigation may use machine learning to identify features in the environment. In some examples, the humanoid transformer may use simultaneous localization and mapping (SLAM) to build a map of a new environment while moving through the environment.

Additional Examples

Additional examples based on principles described herein are enumerated below. Further examples falling within the scope of the subject matter can be configured by, for example, taking one feature of an example in isolation, taking more than one feature of an example in combination, or combining one or more features of one example with one or more features of one or more other examples.

Example 1: A robot includes an upper body comprising a torso, a mobile base comprising a base body and a set of active wheels coupled to the robot base, and a pedestal linkage having a first end portion coupled to the base body and a second end pivotally coupled to the torso, wherein the pedestal linkage is pivotable relative to the base body to transform the upper body between a first configuration and a second configuration.

Figure 22:
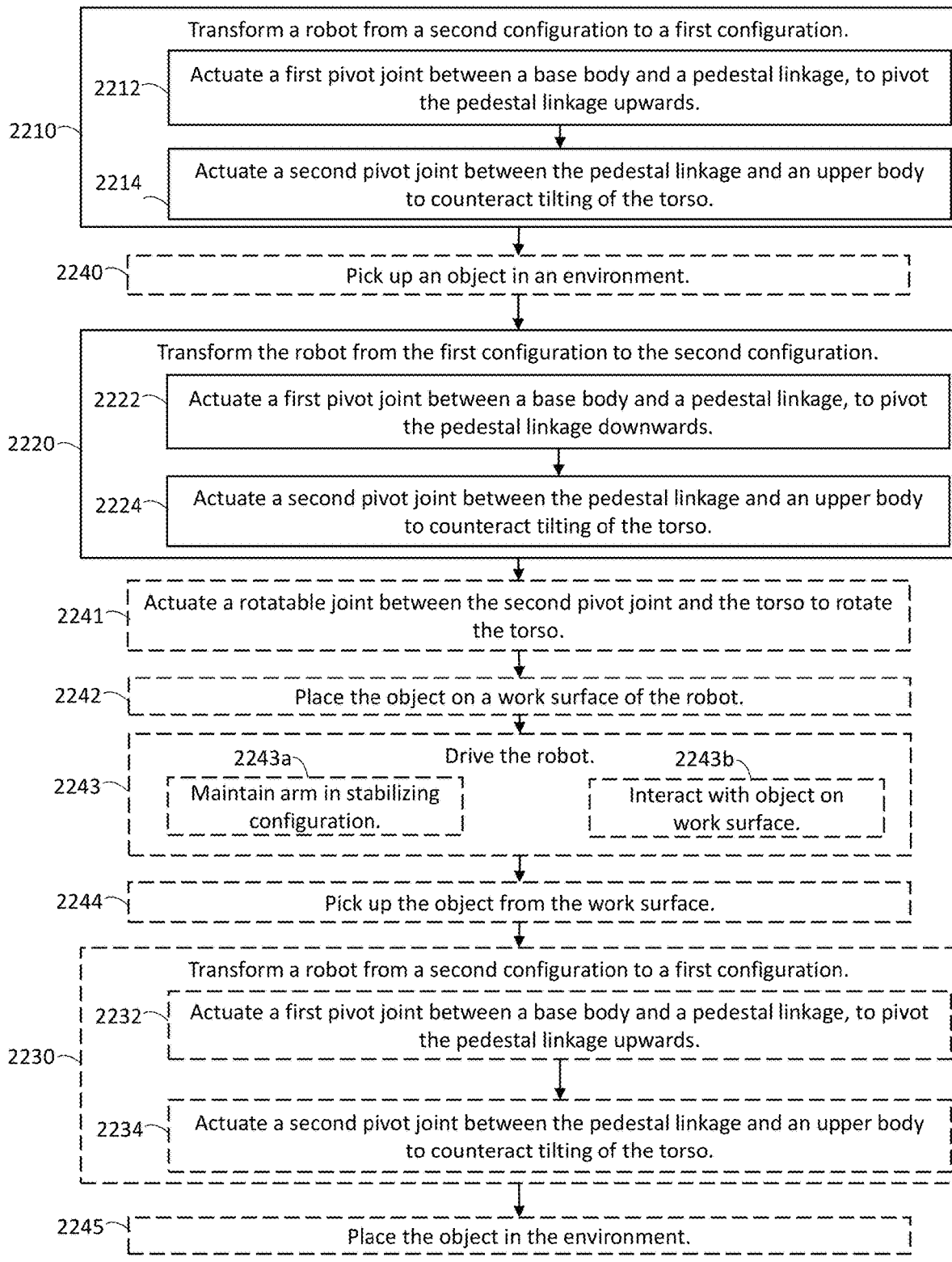
FIG. 22 is a flowchart diagram of a method for operating a transformer robot.

In another example, FIG. 22 is a flowchart diagram showing an exemplary method 2200 of controlling any of the robots discussed herein (such as robot 100 in FIGS. 1-16 or robot 2000 in FIGS. 20 and 21). Method 2200 is performed by any appropriate components of the robots discussed herein, as discussed below with reference to acts of method 2200. Further, a robot controller which controls the robot (such as robot controller 180 in FIG. 19) can include at least one non-transitory processor-readable storage medium storing data and/or processor-executable instructions that, when executed by at least one processor of the robot controller, cause the robot to perform the method 2200. The method 2200 can also be implemented as a computer program product, comprising at least one non-transitory processor-readable storage medium storing processor-executable instructions or data, which when executed by at least one processor of a robot (at least one processor of a robot controller), cause the robot to perform the method 2200.

Many of the acts in method 2200 are optional. In general, method 2200 is directed to transforming a robot between configurations (as in acts 2210, 2220, and 2230). As appropriate for a given application, different acts can be performed before, after, or in-between the transformations of the robot (such as acts 2240, 2241, 2242, 2243, 2243*a*, 2243*b*, 2244, and 2245). In this regard, at least acts 2230, 2232, 2234, 2240, 2241, 2242, 2243, 2243*a*, 2243*b*, 2244, and 2245 in method 2200 are optional and can be omitted as appropriate for a given application. Further, the acts of method 2200 can be reordered, or additional acts can be added, as appropriate for a given application.

At 2210, the robot is transformed from a second configuration to a first configuration. The first configuration can comprise that discussed with reference to robot 100 or robot 2000, and shown in FIGS. 1-3, 5, and 20 (alternatively referred to as an elevated configuration, an elongated configuration, or a standing configuration). The second configuration can comprise that discussed with reference to robot 100 or robot 2000, and shown in FIGS. 6-11, 13-15, and 21 (alternatively referred to as a lowered configuration, contracted configuration, collapsed configuration, or a standing configuration). Generally, transforming the robot from the second configuration to the first configuration in act 2210 comprises controlling a coupling between the torso and the base body through the pedestal linkage to elevate the upper body above the mobile base.

As one example, act 2210 could comprise a robot controller of robot 2000 controlling a coupling between torso 144 and base body 110 of mobile base 102, through telescoping pedestal linkage 2110 to elevate the upper body 104 above mobile base 102 (as shown in FIG. 20). That is, the robot controller of robot 2000 can control at least one actuator in robot 2000 to extend telescoping pedestal linkage 2110.

As another example illustrated in FIG. 22, act 2210 comprises sub-acts 2212 and 2214. At 2212, a first pivot joint between the base body and the pedestal linkage (e.g. lower pivot joint 136) is actuated (e.g. by the robot controller controlling actuator 138) to pivot the pedestal linkage upwards. At 2214, a second pivot joint between the pedestal linkage and an upper body (e.g. upper pivot joint 156) is actuated (e.g. by the robot controller controlling an actuator of the upper pivot joint 156) to counteract tilting of the torso due to actuation of the first pivot joint.

While there are many reasons and scenarios where a robot is transformed between the first configuration and the second configuration, FIG. 22 illustrates an optional implementation where the robot is used to pick up an object from a (relatively) high location, such as a shelf, and then transport the object to another location. To this end, act 2210 elevates the upper body of the robot to be within reaching distance of the object. At optional act 2240, at least one arm coupled to the torso of the robot is actuated to pick up the object in the environment of the robot. For example, the robot controller can control arms 148a and 148b and hands 152a and 152b to grasp the object, and take the object from its resting position.

At 2220, the robot is transformed from the first configuration to the second configuration. As discussed above for method 2200, the first configuration can comprise that discussed with reference to robot 100 or robot 2000, and shown in FIGS. 1-3, 5, and 20, and the second configuration can comprise that discussed with reference to robot 100 or robot 2000, and shown in FIGS. 6-11, 13-15, and 21. Generally, transforming the robot from the first configuration to the second configuration in act 2220 comprises controlling a coupling between the torso and the base body through the pedestal linkage to lower the upper body to be positioned at the mobile base.

As one example, act 2220 could comprise a robot controller of robot 2000 controlling a coupling between torso 144 and base body 110 of mobile base 102, through telescoping pedestal linkage 2110 to lower the upper body 104 to be positioned at mobile base 102 (as shown in FIG. 21). That is, the robot controller of robot 2000 can control at least one actuator in robot 2000 to retract telescoping pedestal linkage 2110.

As another example illustrated in FIG. 22, act 2220 comprises sub-acts 2222 and 2224. At 2222, a first pivot joint between the base body and the pedestal linkage (e.g. lower pivot joint 136) is actuated (e.g. by the robot controller controlling actuator 138) to pivot the pedestal linkage downwards. At 2224, a second pivot joint between the pedestal linkage and an upper body (e.g. upper pivot joint 156) is actuated (e.g. by the robot controller controlling an actuator of the upper pivot joint 156) to counteract tilting of the torso due to actuation of the first pivot joint.

In some implementations, the base body 110 includes a first foot portion and a second foot portion laterally separated from the first foot portion by a slot (e.g. feet portions 122a and 122b separated by slot 124 as discussed earlier). In such implementations, actuating the first pivot joint to pivot the pedestal linkage second end portion downwards, as in 2224, comprises actuating the first pivot joint to pivot the pedestal linkage second end portion downwards until the pedestal linkage is received in the slot. In this configuration, an upper surface of the first foot portion (e.g. surface 128a), an upper surface of the second foot portion (e.g. surface 128b), and a planar surface of the pedestal linkage (e.g. surface 142) can form a congruent work surface when the robot is in the second configuration (as shown for example in FIG. 13).

At optional act 2241, a rotatable joint between the second pivot joint and the torso is actuated to rotate the torso about a rotational axis (e.g. a rotatable joint at torso base 146 which rotates about rotational axis T1, as discussed earlier with reference to FIGS. 6-10). The rotational axis of the rotational joint is orthogonal to a pivot axis of the second pivot joint (T2 in FIG. 2). Further, the rotational axis extends normal to a work surface of the robot (e.g. rotational axis T1 in FIG. 2 extends vertically), whereas the work surface (composed of surfaces 128a, 128b, and 142) extends horizontally as shown in FIGS. 13 and 14. Rotating the torso about the rotational axis can comprise rotating to torso about the rotational axis through at least 180 degrees in at least one direction (or in more directions), to transform the robot between the torso facing away from the work surface (as shown in FIGS. 6 and 7) and the torso facing towards the work surface (as shown in FIGS. 9 and 13). Rotation of the torso can be performed in either or both of the first configuration or the second configuration, or during transformation between the first and second configurations.

At optional act 2242, the object (picked up at 2240) is placed on a work surface of the robot. In particular, the at least one arm which picked up the object can be controlled by the robot controller to position the object at the work surface, and to release the object (if appropriate). The at least one arm can continue to hold the object or maintain a stabilizing position or configuration as appropriate, or interact with the object, as discussed later with reference to act 2243. Placement of the object is shown in FIG. 14, where object 151 has been placed on the work surface composed of surfaces 128a and 128b of base body 110, and surface 142 of the pedestal linkage 106, as labelled in FIG. 13.

In some implementations, in the first configuration the torso faces away from the work surface (as shown for example in FIG. 3), and picks up the object as in act 2240. At some time prior to placing the object on the work surface at 2242 (e.g. prior to, during, or after transformation to the second configuration at 2220), the torso is rotated to face towards the work surface in accordance with act 2241, and then the object is placed on the work surface in accordance with act 2242.

At optional act 2243, a set of wheels of the robot (a set of wheels included in the mobile base) are active wheels (such as Mecanum wheels discussed with reference to FIG. 17A). After the object is picked up (whether or not the object is placed on the work surface), the robot is driven by the set of active wheels to change a location of the robot.

Optionally at 2243a, while the robot is being driven, with the object placed on a work surface of the robot, at least one arm of the robot can be maintained in a stabilizing configuration proximate the object. In some cases, the at least one arm can be maintained in contact with the object to prevent undesired movement of the object. In other cases, the at least one arm could be positioned as a "fence" or "guardrail" which prevents the object from falling off of the work surface during movement of the robot. This can be seen for example in FIG. 9, where arms 148a and 148b extend horizontally above a work surface of base body 110, which would prevent an object from falling off.

Optionally at 2243b, while the robot is being driven with the object placed on the work surface of the robot, the robot can manipulate, process, or otherwise interact with the object (e.g. by at least one arm, end effector, or hand of the robot). For example, arm 148a or 148b (with hand 152a or 152b) could open the object to extract sub-objects (e.g. open a box object to extract other objects from the box object). As another example, the arms or hands could alter a form of the object (e.g. repair or assemble the object). Interaction is not necessarily limited to interaction via arms or hands. In an exemplary implementation, the robot could scan (e.g. via an image sensor or scanner of the robot) a label of the object or integrity of the object (e.g. for inventory or informational purposes) while the robot is driving. In some implementations, at 2243b the robot may prepare the object (in transit) for some action or effect that may subsequently be applied to the object at the location/destination where the object is to be placed at 2245. For example, in implementations where the robot is deployed at a facility comprising a series of work stations through which an object flows for processing, the robot may collect the object at a first station at 2240 and commence transporting the object to a second station at 2243. While the robot is transporting the object between the first station and the second station at 2243, the robot may optionally further process the object in some way (e.g., by performing some assembly or disassembly task(s), some folding or marking task(s), some positioning or orienting task(s), establishing a particular grip on the object, or similar) to prepare the object to be received at the second station at 2245.

After driving the robot at 2243, optional acts 2244, 2230, and 2245 can be performed.

At 2244, at least one arm coupled to the torso of the robot is actuated to pick up the object from the work surface of the robot. For example, the robot controller can control arms 148a and 148b and hands 152a and 152b to grasp the object, and take the object from its resting position.

At 2230, the robot is transformed from the second configuration to the first configuration, similarly to as discussed with reference to act 2210 earlier. As one example, act 2230 could comprise a robot controller of robot 2000 controlling at least one actuator in robot 2000 to extend telescoping pedestal linkage 2110. As another example illustrated in FIG. 22, act 2230 comprises sub-acts 2232 and 2234. At 2232, the first pivot joint between the base body and the pedestal linkage (e.g. lower pivot joint 136) is actuated (e.g. by the robot controller controlling actuator 138) to pivot the pedestal linkage upwards (similar to act 2212 discussed earlier). At 2234, the second pivot joint between the pedestal linkage and an upper body (e.g. upper pivot joint 156) is actuated (e.g. by the robot controller controlling an actuator of the upper pivot joint 156) to counteract tilting of the torso due to actuation of the first pivot joint (similar to act 2214 discussed earlier).

At 2245, the object (picked up at 2244) is placed in an environment of the robot. In particular, the at least one arm which picked up the object can be controlled by the robot controller to position the object at a pertinent location (e.g. a shelf), and to release the object. In an optional implementation, the first pivot joint (e.g. lower pivot joint 136) is positioned at a first end of the mobile base (e.g. first end 116) and the mobile base has a second end (e.g. second end 117) opposite the first end (see for example FIGS. 3 and 9). In such an implementation, actuating the first pivot joint to pivot the pedestal linkage upwards (to elevate the upper body above the mobile base) as in acts 2212 and 2232 comprises actuating the first pivot joint to pivot the pedestal linkage upwards to position the upper body between the first end and the second end of the mobile base (as shown in FIG. 3 and discussed earlier). Further in such an implementation, actuating the first pivot joint to pivot the pedestal linkage downwards (to lower the upper body to the mobile base) as in act 2222 comprises actuating the first pivot joint to pivot the pedestal linkage downwards to position the upper body adjacent the second end of the mobile base.

In an optional implementation, at least one passive wheel is coupled to the pedestal linkage at a base of the torso (e.g. one or more passive wheels 160 shown in at least FIG. 9). In such implementations, actuating the first pivot joint to pivot the pedestal linkage downwards (to lower the upper body to the mobile base) as in act 2222 comprises actuating the first pivot joint to pivot the pedestal linkage downwards to position the upper body adjacent an end of the mobile base with the passive wheel in contact with a ground surface, as discussed earlier.

In some implementations, the mobile base is positioned in an xy-plane and the upper body is positioned in an xz-plane (as discussed earlier and shown in FIGS. 1, 2, 3, and 7, 8, 9, 10, and 11). The pedestal linkage is positioned in the xz-plane and is coupled to the mobile base at a first pivot joint (e.g. lower pivot joint 136) at which the pedestal linkage is pivotable in the xz-plane about a first y axis (T3), and to the torso at a second pivot joint (e.g. upper pivot joint 156) at which the pedestal linkage is pivotable in the xz-plane about a second y-axis (T2). In such implementations, transforming the robot from the second configuration to the first configuration as in acts 2210 and 2230 comprises controlling the first pivot joint to pivot the pedestal linkage to position at least a portion of the pedestal linkage out of and non-parallel to the xy-plane. That is, the pedestal linkage 106 is pivoted at the first pivot joint to elevate at least a portion thereof to be out-of-line with the mobile base (as discussed earlier and as can be seen in at least FIGS. 4 and 12). Further in such implementations, transforming the robot from the first configuration to the second configuration as in act 2220 comprises controlling the first pivot joint to pivot the pedestal linkage to position at least a portion of the pedestal linkage co-planar or parallel to the xy-plane. That is, the pedestal linkage 106 is pivoted at the first pivot joint to lower at least a portion thereof to be in line with the mobile base (as discussed earlier and as can be seen in at least FIGS. 6, 7, and 9). In these exemplary implementations, the second pivot joint can be controlled to counteract tilting of the torso due to pivoting of the pedestal linkage at the first pivot joint, as in acts 2214, 2224, and 2234 in FIG. 22.

The systems, methods, and computer program products described herein may, in some implementations, employ any of the teachings of the present systems, methods, control modules, and computer program products include, without limitation, the general-purpose humanoid robots developed by Sanctuary Cognitive Systems Corporation, various aspects of which are described in U.S. patent application Ser. No. 18/375,943, U.S. patent application Ser. No. 18/513,440, U.S. patent application Ser. No. 18/417,081, U.S. patent application Ser. No. 18/424,551, U.S. patent application Ser. No. 16/940,566 (Publication No. US 2021-0031383 A1), U.S. patent application Ser. No. 17/023,929 (Publication No. US 2021-0090201 A1), U.S. patent application Ser. No. 17/061,187 (Publication No. US 2021-0122035 A1), U.S. patent application Ser. No. 17/098,716 (Publication No. US 2021-0146553 A1), U.S. patent application Ser. No. 17/111,789 (Publication No. US 2021-0170607 A1), U.S. patent application Ser. No. 17/158,244 (Publication No. US 2021-0234997 A1), U.S. Provisional Patent Application Ser. No. 63/001,755 (Publication No. US 2021-0307170 A1), and/or U.S. Provisional Patent Application Ser. No. 63/057,461, as well as U.S. Provisional Patent Application Ser. No. 63/151,044, U.S. Provisional Patent Application Ser. No. 63/173,670, U.S. Provisional Patent Application Ser. No. 63/184,268, U.S. Provisional Patent Application Ser. No. 63/213,385, U.S. Provisional Patent Application Ser. No. 63/232,694, U.S. Provisional Patent Application Ser. No. 63/316,693, U.S. Provisional Patent Application Ser. No. 63/253,591, U.S. Provisional Patent Application Ser. No. 63/293,968, U.S. Provisional Patent Application Ser. No. 63/293,973, and/or U.S. Provisional Patent Application Ser. No. 63/278,817, each of which is incorporated herein by reference in its entirety . . .

Throughout this specification and the appended claims the term "communicative" as in "communicative coupling" and in variants such as "communicatively coupled," is generally used to refer to any engineered arrangement for transferring and/or exchanging information. For example, a communicative coupling may be achieved through a variety of different media and/or forms of communicative pathways, including without limitation: electrically conductive pathways (e.g., electrically conductive wires, electrically conductive traces), magnetic pathways (e.g., magnetic media), wireless signal transfer (e.g., radio frequency antennae), and/or optical pathways (e.g., optical fiber). Exemplary communicative couplings include, but are not limited to: electrical couplings, magnetic couplings, radio frequency couplings, and/or optical couplings.

Throughout this specification and the appended claims, infinitive verb forms are often used. Examples include, without limitation: "to encode," "to provide," "to store," and the like. Unless the specific context requires otherwise, such infinitive verb forms are used in an open, inclusive sense, that is as "to, at least, encode," "to, at least, provide," "to, at least, store," and so on.

This specification, including the drawings and the abstract, is not intended to be an exhaustive or limiting description of all implementations and embodiments of the present robots, robot systems and methods. A person of skill in the art will appreciate that the various descriptions and drawings provided may be modified without departing from the spirit and scope of the disclosure. In particular, the teachings herein are not intended to be limited by or to the illustrative examples of computer systems and computing environments provided.

This specification provides various implementations and embodiments in the form of block diagrams, schematics, flowcharts, and examples. A person skilled in the art will understand that any function and/or operation within such block diagrams, schematics, flowcharts, or examples can be implemented, individually and/or collectively, by a wide range of hardware, software, and/or firmware. For example, the various embodiments disclosed herein, in whole or in part, can be equivalently implemented in one or more: application-specific integrated circuit(s) (i.e., ASICs); standard integrated circuit(s); computer program(s) executed by any number of computers (e.g., program(s) running on any number of computer systems); program(s) executed by any number of controllers (e.g., microcontrollers); and/or program(s) executed by any number of processors (e.g., microprocessors, central processing units, graphical processing units), as well as in firmware, and in any combination of the foregoing.

Throughout this specification and the appended claims, a "memory" or "storage medium" is a processor-readable medium that is an electronic, magnetic, optical, electromagnetic, infrared, semiconductor, or other physical device or means that contains or stores processor data, data objects, logic, instructions, and/or programs. When data, data objects, logic, instructions, and/or programs are implemented as software and stored in a memory or storage medium, such can be stored in any suitable processor-readable medium for use by any suitable processor-related instruction execution system, apparatus, or device, such as a computer-based system, processor-containing system, or other system that can fetch the data, data objects, logic, instructions, and/or programs from the memory or storage medium and perform various acts or manipulations (i.e., processing steps) thereon and/or in response thereto. Thus, a "non-transitory processor-readable storage medium" can be any element that stores the data, data objects, logic, instructions, and/or programs for use by or in connection with the instruction execution system, apparatus, and/or device. As specific non-limiting examples, the processor-readable medium can be: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and/or any other non-transitory medium.

The claims of the disclosure are below. This disclosure is intended to support, enable, and illustrate the claims but is not intended to limit the scope of the claims to any specific implementations or embodiments. In general, the claims should be construed to include all possible implementations and embodiments along with the full scope of equivalents to which such claims are entitled.

What is claimed is:

1. A method of controlling a robot, the robot including an upper body having a torso, a mobile base having a base body and a set of wheels coupled to the base body, and a pedestal linkage that comprises a first end portion pivotally coupled to the base body at a first pivot joint and a second end portion pivotally coupled to the torso at a second pivot joint, the method comprising:
    transforming the robot from a second configuration in which the upper body is positioned at the mobile base to a first configuration in which the upper body is elevated relative to the mobile base, wherein transforming the robot from the second configuration to the first configuration includes:
    actuating the first pivot joint to pivot the pedestal linkage second end portion upwards; and
    actuating the second pivot joint to counteract tilting of the torso due to pivoting of the pedestal linkage at the first pivot joint; and
    transforming the robot from the first configuration to the second configuration, wherein transforming the robot from the first configuration to the second configuration includes:
    actuating the first pivot joint to pivot the pedestal linkage second end portion downwards; and
    actuating the second pivot joint to counteract tilting of the torso due to pivoting of the pedestal linkage at the first pivot joint.

2. The method of claim 1, wherein:
    the base body includes a first foot portion and a second foot portion laterally separated from the first foot portion by a slot; and
    actuating the first pivot joint to pivot the pedestal linkage second end portion downwards comprises: actuating the first pivot joint to pivot the pedestal linkage second end portion downwards until the pedestal linkage is received in the slot with an upper surface of the first foot portion, an upper surface of the second foot portion, and a planar surface of the pedestal linkage forming a congruent work surface in the second configuration.

3. The method of claim 2, wherein the second pivot joint pivots about a pivot axis, and the method further comprises:
    actuating a rotatable joint between the second pivot joint and the torso to rotate the torso about a rotational axis that is orthogonal to the pivot axis.

4. The method of claim 3, wherein:
    the base body includes a work surface and the rotational axis extends normal to the work surface; and rotating the torso about the rotational axis comprises rotating the torso about the rotational axis through at least 180 degrees in at least one direction to transform the robot between the torso facing away from the work surface and the torso facing towards the work surface in at least the second configuration.

5. The method of claim 1, further comprising:
after transforming the robot to the first configuration, actuating at least one arm coupled to the torso to pick up an object in an environment of the robot; and
after transforming the robot to the second configuration, placing the object on a work surface of the robot formed by the base body and the pedestal linkage in the second configuration.

6. The method of claim 5, wherein:
the second pivot joint pivots about a pivot axis; and
the method further comprises: after picking up the object, prior to placing the object on the work surface of the robot, actuating a rotatable joint between the second pivot joint and the torso to rotate the torso about a rotational axis to face the work surface, the rotational axis orthogonal to the pivot axis and normal to the work surface.

7. The method of claim 5, wherein the set of wheels is a set of active wheels, and the method further comprises:
after placing the object on the work surface of the robot, driving the robot by the set of active wheels to change a location of the robot.

8. The method of claim 7, further comprising, after changing the location of the robot:
actuating the at least one arm coupled to the torso to pick up the object from the work surface of the robot;
transforming the robot from the second configuration to the first configuration; and
actuating the at least one arm coupled to the torso to place the object in the environment of the robot.

9. The method of claim 7, further comprising:
while driving the robot, maintaining the at least one arm in a stabilizing configuration proximate the object.

10. The method of claim 7, further comprising:
while driving the robot, interacting with the object on the work surface.

11. The method of claim 1, wherein:
the first pivot joint is positioned at a first end of the mobile base;
the mobile base has a second end opposite the first end;
actuating the first pivot joint to pivot the pedestal linkage second end portion upwards includes actuating the first pivot joint to pivot the pedestal linkage second end portion upwards to position the upper body above the mobile base in between the first end and the second end of the mobile base; and actuating the first pivot joint to pivot the pedestal linkage second end portion downwards includes actuating the first pivot joint to pivot the pedestal linkage second end portion downwards to position the upper body adjacent the second end of the mobile base.

12. The method of claim 1, wherein:
at least one passive wheel is coupled to the pedestal linkage at a base of the torso; and
actuating the first pivot joint to pivot the pedestal linkage second end portion downwards includes actuating the first pivot joint to pivot the pedestal linkage second end portion downwards to position the upper body adjacent an end of the mobile base with the at least one passive wheel in contact with a ground surface.

13. The method of claim 1, wherein actuating the first pivot joint to pivot the pedestal linkage second end portion downwards includes: actuating the first pivot joint to pivot the pedestal linkage second end portion downwards where a dorsal surface of the pedestal linkage and an upper surface of the base body form a congruent work surface in the second configuration.

14. The method of claim 1, further comprising driving the robot by a set of active wheels included in the mobile base.

15. The method of claim 1, further comprising actuating at least one arm coupled to the torso to engage with an object in an environment of the robot.

16. The method of claim 1, wherein:
the mobile base is positioned in an xy-plane;
the upper body is positioned in an xz-plane;
the pedestal linkage is positioned in the xz-plane and is coupled to the mobile base at the first pivot joint at which the pedestal linkage is pivotable in the xz-plane about a first y-axis and to the torso at the second pivot joint at which the pedestal linkage is pivotable in the xz-plane about a second y-axis;
transforming the robot from the second configuration to the first configuration comprises controlling the first pivot joint to pivot the pedestal linkage to position at least a portion of the pedestal linkage out of and non-parallel to the xy-plane; and
transforming the robot from the first configuration to the second configuration comprises controlling the first pivot joint to pivot the pedestal linkage to position the at least a portion of the pedestal linkage co-planar or parallel to the xy-plane.

17. The method of claim 16, further comprising controlling the second pivot joint to counteract tilting of the torso due to pivoting of the pedestal linkage at the first pivot joint.

* * * * *